(12) United States Patent
Han et al.

(10) Patent No.: US 9,629,152 B2
(45) Date of Patent: *Apr. 18, 2017

(54) METHOD AND APPARATUS OF TRANSMITTING INFORMATION IN WIRELESS COMMUNICATION SYSTEM

(71) Applicant: LG ELECTRONICS INC., Seoul (KR)

(72) Inventors: Seung Hee Han, Anyang-si (KR); Moon Il Lee, Anyang-si (KR); Yeong Hyeon Kwon, Anyang-si (KR); Jin Sam Kwak, Anyang-si (KR); Hyun Woo Lee, Anyang-si (KR); Dong Cheol Kim, Anyang-si (KR); Jae Hoon Chung, Anyang-si (KR); Sung Ho Moon, Anyang-si (KR); Min Seok Noh, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 234 days.

This patent is subject to a terminal disclaimer.

(21) Appl. No.: 14/531,633

(22) Filed: Nov. 3, 2014

(65) Prior Publication Data

US 2015/0098453 A1  Apr. 9, 2015

Related U.S. Application Data

(63) Continuation of application No. 13/057,130, filed as application No. PCT/KR2009/004477 on Aug. 11, 2009, now Pat. No. 8,908,596.
(Continued)

(30) Foreign Application Priority Data

May 27, 2009 (KR) .......... 10-2009-0046246
Jun. 26, 2009 (KR) .......... 10-2009-0057834

(51) Int. Cl.
*H04J 3/00* (2006.01)
*H04W 72/04* (2009.01)
(Continued)

(52) U.S. Cl.
CPC ...... *H04W 72/0446* (2013.01); *H04B 7/0413* (2013.01); *H04B 7/068* (2013.01);
(Continued)

(58) Field of Classification Search
None
See application file for complete search history.

(56) References Cited

U.S. PATENT DOCUMENTS 6,141,393 A   10/2000  Thomas et al.
6,566,948 B1   5/2003  Braithwaite
(Continued)

FOREIGN PATENT DOCUMENTS

CN   1702995 A   11/2005
CN   1770658     5/2006
(Continued)

OTHER PUBLICATIONS

LG Electronics: "PHICH linkage to uplink transmissions", 3GPP TSG RAN WG1#52, R1-080999, Feb. 11-15, 2008.
(Continued)

*Primary Examiner* — Willie J Daniel, Jr.
(74) *Attorney, Agent, or Firm* — Dentons US LLP

(57) ABSTRACT

A method and an apparatus of transmitting information in a wireless communication system are provided. The method includes transmitting information based on a first resource index through a first antennae and transmitting the information based on a second resource index through a second antennae.

14 Claims, 17 Drawing Sheets

Related U.S. Application Data

(60) Provisional application No. 61/117,237, filed on Nov. 24, 2008, provisional application No. 61/114,480, filed on Nov. 14, 2008, provisional application No. 61/087,737, filed on Aug. 11, 2008.

(51) Int. Cl.

| | | |
|---|---|---|
| *H04B 7/06* | (2006.01) | |
| *H04B 7/0413* | (2017.01) | |
| *H04W 72/08* | (2009.01) | |
| *H04W 72/12* | (2009.01) | |
| *H04L 1/16* | (2006.01) | |
| H04L 1/00 | (2006.01) | |
| H04L 1/18 | (2006.01) | |
| H04L 5/00 | (2006.01) | |
| H04L 27/26 | (2006.01) | |

(52) U.S. Cl.
CPC ......... *H04B 7/0671* (2013.01); *H04L 1/0028* (2013.01); *H04L 1/1607* (2013.01); *H04L 1/1854* (2013.01); *H04W 72/085* (2013.01); *H04W 72/1278* (2013.01); *H04B 7/0632* (2013.01); *H04B 7/0639* (2013.01); *H04L 1/0026* (2013.01); *H04L 1/1812* (2013.01); *H04L 1/1848* (2013.01); *H04L 5/0044* (2013.01); *H04L 5/0048* (2013.01); *H04L 5/0091* (2013.01); *H04L 27/2602* (2013.01)

(56) References Cited

U.S. PATENT DOCUMENTS

| | | |
|---|---|---|
| 6,925,112 B1 | 8/2005 | Morejon et al. |
| 7,177,351 B2 | 2/2007 | Kadous |
| 7,620,096 B2 | 11/2009 | Bar-Ness et al. |
| 7,724,836 B2 | 5/2010 | Hartmann et al. |
| 7,876,739 B2 | 1/2011 | Ahn et al. |
| 7,974,593 B2 | 7/2011 | Cole et al. |
| 7,995,615 B2 | 8/2011 | Yang et al. |
| 8,116,277 B2 | 2/2012 | Lee et al. |
| 8,238,320 B2 | 8/2012 | Kim et al. |
| 8,249,201 B2 | 8/2012 | Xu et al. |
| 8,249,608 B2 | 8/2012 | Heo et al. |
| 8,331,305 B2 | 12/2012 | Wennstrom et al. |
| 8,385,467 B2 | 2/2013 | Han et al. |
| 8,537,763 B2 | 9/2013 | Wang et al. |
| 8,767,646 B2 | 7/2014 | Han et al. |
| 8,908,596 B2 * | 12/2014 | Han ................... H04L 1/1607 370/319 |
| 8,964,686 B2 | 2/2015 | Han et al. |
| 2003/0235147 A1 | 12/2003 | Walton et al. |
| 2004/0120411 A1 | 6/2004 | Walton et al. |
| 2005/0047387 A1 | 3/2005 | Frederiksen et al. |
| 2005/0175112 A1 | 8/2005 | Pisoni et al. |
| 2005/0190728 A1 | 9/2005 | Han et al. |
| 2006/0039496 A1 | 2/2006 | Chae et al. |
| 2006/0039497 A1 | 2/2006 | Vu et al. |
| 2006/0077886 A1 | 4/2006 | Oh et al. |
| 2006/0093066 A1 | 5/2006 | Jeong et al. |
| 2006/0133530 A1 | 6/2006 | Kwak et al. |
| 2006/0209754 A1 | 9/2006 | Ji et al. |
| 2007/0014272 A1 | 1/2007 | Palanki et al. |
| 2007/0036179 A1 | 2/2007 | Palanki et al. |
| 2007/0183386 A1 | 8/2007 | Muharemovic et al. |
| 2007/0189404 A1 | 8/2007 | Baum et al. |
| 2008/0049692 A1 | 2/2008 | Bachu et al. |
| 2008/0095252 A1 | 4/2008 | Kim et al. |
| 2008/0117833 A1 | 5/2008 | Borran et al. |
| 2008/0153425 A1 | 6/2008 | Heo et al. |
| 2008/0165893 A1 | 7/2008 | Malladi et al. |
| 2008/0186916 A1 | 8/2008 | Oshiba et al. |
| 2008/0186918 A1 | 8/2008 | Tinnakornsrisuphap et al. |
| 2008/0198902 A1 | 8/2008 | Malladi |
| 2008/0205348 A1 | 8/2008 | Malladi |
| 2008/0212506 A1 | 9/2008 | Lee et al. |
| 2008/0212514 A1 | 9/2008 | Chen |
| 2008/0212555 A1 | 9/2008 | Kim et al. |
| 2008/0225791 A1 | 9/2008 | Pi et al. |
| 2008/0227481 A1 | 9/2008 | Naguib et al. |
| 2008/0232240 A1 | 9/2008 | Baum et al. |
| 2008/0232449 A1 | 9/2008 | Khan et al. |
| 2008/0233966 A1 | 9/2008 | Scheim et al. |
| 2008/0253484 A1 | 10/2008 | Kakura et al. |
| 2008/0273513 A1 | 11/2008 | Montojo et al. |
| 2008/0273516 A1 | 11/2008 | Kim et al. |
| 2008/0318608 A1 | 12/2008 | Inoue et al. |
| 2009/0010240 A1 | 1/2009 | Papasakellariou et al. |
| 2009/0028261 A1 | 1/2009 | Zhang et al. |
| 2009/0034468 A1 | 2/2009 | Muharemovic et al. |
| 2009/0046645 A1 | 2/2009 | Bertrand et al. |
| 2009/0046694 A1 | 2/2009 | Matsumoto et al. |
| 2009/0060004 A1 | 3/2009 | Papasakellariou et al. |
| 2009/0073955 A1 | 3/2009 | Malladi |
| 2009/0092073 A1 | 4/2009 | Doppler et al. |
| 2009/0092146 A1 | 4/2009 | Hargrove et al. |
| 2009/0092148 A1 | 4/2009 | Zhang et al. |
| 2009/0186613 A1 | 7/2009 | Ahn et al. |
| 2009/0196240 A1 | 8/2009 | Frederiksen et al. |
| 2009/0196249 A1 | 8/2009 | Kawamura et al. |
| 2009/0239476 A1 | 9/2009 | Womack et al. |
| 2009/0245194 A1 | 10/2009 | Damnjanovic et al. |
| 2009/0245212 A1 | 10/2009 | Sambhwani et al. |
| 2009/0245284 A1 | 10/2009 | Xu et al. |
| 2009/0268833 A1 | 10/2009 | Ariyavisitakul et al. |
| 2009/0274100 A1 | 11/2009 | Montojo et al. |
| 2009/0276507 A1 | 11/2009 | Ahn et al. |
| 2009/0276675 A1 | 11/2009 | Ojala et al. |
| 2009/0280819 A1 | 11/2009 | Brisebois et al. |
| 2009/0285160 A1 | 11/2009 | Cheng et al. |
| 2009/0323617 A1 | 12/2009 | Che et al. |
| 2009/0323625 A1 | 12/2009 | Lee et al. |
| 2010/0022208 A1 | 1/2010 | Cole et al. |
| 2010/0040164 A1 | 2/2010 | Castelain et al. |
| 2010/0046584 A1 | 2/2010 | Palanki et al. |
| 2010/0061361 A1 | 3/2010 | Wu |
| 2010/0091672 A1 | 4/2010 | Ishii |
| 2010/0091724 A1 | 4/2010 | Ishii et al. |
| 2010/0098012 A1 | 4/2010 | Bala et al. |
| 2010/0118800 A1 | 5/2010 | Kim et al. |
| 2010/0135360 A1 | 6/2010 | Kwak et al. |
| 2010/0150081 A1 | 6/2010 | Gao et al. |
| 2010/0150114 A1 | 6/2010 | Che |
| 2010/0150259 A1 | 6/2010 | Castelain et al. |
| 2010/0177741 A1 | 7/2010 | Zhang et al. |
| 2010/0177804 A1 | 7/2010 | Kwak et al. |
| 2010/0179862 A1 | 7/2010 | Chassin et al. |
| 2010/0183104 A1 | 7/2010 | Alexander et al. |
| 2010/0195594 A1 | 8/2010 | Seo et al. |
| 2010/0227569 A1 | 9/2010 | Bala et al. |
| 2010/0302993 A1 | 12/2010 | Robertson et al. |
| 2010/0329200 A1 | 12/2010 | Chen et al. |
| 2010/0329220 A1 | 12/2010 | Kim et al. |
| 2011/0009137 A1 | 1/2011 | Chung et al. |
| 2011/0064164 A1 | 3/2011 | Seo et al. |
| 2011/0090997 A1 | 4/2011 | Han et al. |
| 2011/0103367 A1 | 5/2011 | Ishii |
| 2011/0134861 A1 | 6/2011 | Seo et al. |
| 2011/0134968 A1 | 6/2011 | Han et al. |
| 2011/0158200 A1 | 6/2011 | Bachu et al. |
| 2011/0176624 A1 | 7/2011 | Annavajjala et al. |
| 2011/0194524 A1 | 8/2011 | Hedlund et al. |
| 2011/0199997 A1 | 8/2011 | Wennstrom et al. |
| 2011/0205928 A1 | 8/2011 | Pelletier et al. |
| 2011/0205996 A1 | 8/2011 | Kim et al. |
| 2011/0211522 A1 | 9/2011 | Chung et al. |
| 2011/0261729 A1 | 10/2011 | Ahn et al. |
| 2011/0261895 A1 | 10/2011 | Zhang et al. |
| 2011/0268053 A1 | 11/2011 | Che et al. |
| 2011/0274079 A1 | 11/2011 | Lee et al. |
| 2011/0280203 A1 | 11/2011 | Han et al. |
| 2011/0292900 A1 | 12/2011 | Ahn et al. |
| 2012/0014465 A1 | 1/2012 | Zhang et al. |
| 2012/0026966 A1 | 2/2012 | Wennstrom et al. |

(56) References Cited

U.S. PATENT DOCUMENTS

| | | | |
|---|---|---|---|
| 2012/0045024 | A1 | 2/2012 | Cui et al. |
| 2012/0082113 | A1 | 4/2012 | Lee et al. |
| 2012/0083302 | A1 | 4/2012 | Borran et al. |
| 2012/0099546 | A1 | 4/2012 | Cho et al. |
| 2012/0140798 | A1 | 6/2012 | Kadous et al. |
| 2012/0177012 | A1 | 7/2012 | Buckley et al. |
| 2012/0236773 | A1 | 9/2012 | Shen et al. |
| 2012/0263250 | A1 | 10/2012 | Yap et al. |
| 2013/0016701 | A1 | 1/2013 | Malladi et al. |
| 2013/0129013 | A1 | 5/2013 | Han et al. |
| 2013/0155891 | A1 | 6/2013 | Dinan |
| 2013/0178221 | A1 | 7/2013 | Jung et al. |
| 2014/0050190 | A1 | 2/2014 | Shimezawa et al. |
| 2015/0163025 | A1 | 6/2015 | Han et al. |

FOREIGN PATENT DOCUMENTS

| | | |
|---|---|---|
| CN | 1770658 A | 5/2006 |
| CN | 101006658 | 7/2007 |
| CN | 101006658 A | 7/2007 |
| CN | 101006659 A | 7/2007 |
| CN | 101006659 A | 7/2007 |
| CN | 101027867 | 8/2007 |
| CN | 101027867 A | 8/2007 |
| CN | 101222291 A | 7/2008 |
| EP | 2007021 A1 | 12/2008 |
| EP | 2077692 A2 | 12/2008 |
| EP | 2313988 A2 | 4/2011 |
| EP | 2334134 A2 | 6/2011 |
| EP | 2357735 A2 | 8/2011 |
| EP | 2437561 A1 | 4/2012 |
| JP | 2004-524727 A | 8/2004 |
| JP | 2007-536830 A | 12/2007 |
| JP | 2009-290615 A | 12/2009 |
| JP | 4511611 B2 | 7/2010 |
| JP | 2010-532130 A | 9/2010 |
| JP | 2010-536226 A | 11/2010 |
| JP | 2011-530941 A | 12/2011 |
| KR | 1020050081552 A | 8/2005 |
| KR | 1020060032765 A | 4/2006 |
| KR | 1020070074431 A | 7/2007 |
| KR | 1020080097360 A | 9/2007 |
| KR | 10-2007-0091889 | 12/2007 |
| KR | 10-2007-0119958 A | 12/2007 |
| KR | 1020070119958 A | 12/2007 |
| KR | 1020080056621 A | 6/2008 |
| KR | 10-2008-0065558 A | 7/2008 |
| KR | 1020080064756 A | 7/2008 |
| KR | 1020080065562 A | 7/2008 |
| KR | 1020080073616 A | 8/2008 |
| KR | 1020080096088 A | 10/2008 |
| WO | 02/47278 A2 | 6/2002 |
| WO | 03/021795 A2 | 3/2003 |
| WO | 2006/001909 A2 | 1/2006 |
| WO | 2006/019250 A | 2/2006 |
| WO | 2006/019253 A1 | 2/2006 |
| WO | 2006/029050 A2 | 3/2006 |
| WO | 2006/039185 | 4/2006 |
| WO | 2007/084988 A2 | 7/2007 |
| WO | 2007/119415 | 10/2007 |
| WO | 2008024788 A2 | 2/2008 |
| WO | 2008/044830 A1 | 4/2008 |
| WO | 2008/086517 A1 | 7/2008 |
| WO | 2008085000 A1 | 7/2008 |
| WO | 2008115004 A2 | 9/2008 |
| WO | 2008/137864 A2 | 11/2008 |
| WO | 2008137864 A2 | 11/2008 |
| WO | 2009/002093 A2 | 12/2008 |
| WO | 2009/020358 A | 2/2009 |
| WO | 2010/110561 A2 | 9/2010 |

OTHER PUBLICATIONS

LG Electronics: "Uplink ACK/NACK Index Mapping", 3GPP RAN WG1 #48-BIS, R1-071547, Mar. 26-30, 2007.
LG Electronics: "Allocation of UL ACK/NACK index", 3GPP TSG RAN WG1#49, R1-072348, May 7-11, 2007.
Huawei: "Relation between UL ACK/NACK and DL CCE", 3GPP TSG-RAN-WG1 #50bis, R1-074063, Oct. 8-12, 2007.
Change Request: Motorola: "36.213 PUCCH timing and other formatting and typo corrections", 3GPP TSG-RAN WG1 Meeting #52bis, R1-081586, Mar. 31-Apr. 4, 2008.
Draft Change Request: Ericsson: Introducing missing L1 parameters to 36.211, 3GPP TSG-RAN Meeting #53bIs, R1-082655, Jun. 30-Jul. 4, 2008.
Ericsson: Change Draft Request, "Introducing missing L1 parameters to 36.211", 3GPP TSG-RAN Meeting #53bis, R1-082655, Jun. 30-Jul. 4, 2008.
Motorola: Change Request, "36.213 PUCCH timing and other formatting and typo corrections", 3GPP TSG-RAN WG1 Meeting #52bis, R1-081583, Mar. 31-Apr. 4, 2008.
LG Electronics: "Uplink ACK/NACK Index Mapping", 3GPP RAN WG1 #48-Bis, R10071547, Mar. 26-30, 2007.
ETRI: "Sequence allocation and hopping for uplink ACK/NACK channels", 3GPP TSG RAN WG1 Meeting #50, R1-073413, Aug. 20-24, 2007.
T.J. Noh et al., "Standardization of 3GPP LTE and LTE-Advanced", Electronics and Communication Trend Analysis, vol. 23, No. 3, Jun. 2008. See chapter II-2.
Nortel, UL MIMO Enhancement for LTE-A, 3GPPP R1-082516, Jul. 5, 2008.
Mitsubishi Electric, Uplink transit diversity schemes for LTE Advanced, 3GPP R1-082522, Jul. 4, 2008.
Alcatel, ST/SF Coding and Mapping Schemes for the SC-FDMA in E-UTRA Uplink, 3GPP R1-063178, Nov. 10, 2006.
Qualcomm Europe, Further details on UL ACK/NAK resource allocation, 3GPP R1-081966. May 9, 2008.
Texas Instruments et al., On Remaining Issues of PUCCH Slot Based CS/OC Remapping, 3GPP R1-082660, Jul. 4, 2008.
Panasonic et al., Joint Way forward on the ACK/NACK scrambling for PUCCH, 3GPP R1-082731. Jul. 4, 2008.
Ericsson, "Carrier aggregation in LTE-Advanced", 3GPP TSG-RAN WG1 #53bis. R1-082468. Jul. 2008.
NEC Group, "PUCCH allocation for ACK/NACK transmission", 3GPP TSG RAN WG1 Meeting #50, R1-073462, Aug. 2007.
Motorola, "UL ACK/NACK for TDD", 3GPP TSG RAN1 #52, R1-080738, Feb. 2008.
Nokia Siemens Networks et al., "ACK/NACK Bundling Details for LTE TDD", 3GPP R1⁻ 081858, May 9, 2008.
Qualcomm Europe, "UL ACK/NACK assignment procedure", 3GPP R1-083176, Aug. 22, 2008.
InterDigital Communications et al., ACK/NACK Index Mapping for Uplink Transmission for E-UTRA, 3GPP, R1-074701, Nov. 9, 2007.
Huawei, "Physical layer technologies for LTE-Advanced", 3GPP, R1-081838, May 9, 2008.
Motorola, "Uplink ACK/NACK for TDD", 3GPP, R1-081292, Apr. 4, 2008.
Nokia Siemens Networks et al., "Implicit Mapping of ACK/NACK Resources", 3GPP, R1⁻ 080939, Feb. 15, 2008.
LG Electronics Inc., "Efficient Utilization of Unused PUCCH RB", 3GPP, R1-081258, Apr. 4, 2008.
Nokia Siemens Networks et al., "PUCCH Resource Allocation for Repeated ACK/NACK", 3GPP, R1-083722, Oct. 3, 2008.
LG Electronics, "Uplink MIMO transmission for LTE-Advanced", 3GPP TSG RAN WG1 Meeting #55, Prague, Czech Republic, Nov. 10-14, 2008, R1-084199.
Nortel, "Performance evaluation of multi-antenna SC-FDMA in LTE-A", 3GPP TSG RAN WG1 Meeting #55, Prague, Czech Republic, Nov. 10-14, 2008, R1-084471.
Papasakellarious et al., "Sequence Hopping in SC-FDMA Communication Systems", Aug. 30, 2007.

(56) References Cited

OTHER PUBLICATIONS

3GPP TSG RAN WG1 Meeting #54, R1-083094, Jeju, South Korea, Aug. 18-22, 2008, Nokia Siemens Networks, Nokia, PUCCH Resource Allocation for Repeated ACK/NACK.
Samsung, "Selection of Orthogonal Cover and Cyclic Shift for High Speed UL ACK Channels", 3GPP TSG RAN WG1 Meeting#50, R1-073564, Athens, Greece, Aug. 20-24, 2007.
Alcatel: "ST/SF Coding and Mapping Schemes of the SC-FDMA in E-UTRA Uplink", 3GPP TSG RAN WG1 Meeting #47, R1-063178, Nov. 6-10, 2006.
Qualcomm Europe: "Further details on UL ACK/NAK resource allocation", 3GPP TSG RAN1 #53, R1-081966, May 5-9, 2008.

\* cited by examiner

METHOD AND APPARATUS OF TRANSMITTING INFORMATION IN WIRELESS COMMUNICATION SYSTEM

This application is a continuation application of U.S. application Ser. No. 13/057,130 filed Mar. 28, 2011, which is a National Stage Entry of International Application No. PCT/KR2009/004477 filed Aug. 11, 2009, which claims priority to U.S. Provisional Application No. 61/087,737 filed Aug. 11, 2008, 61/114,480 filed Nov. 14, 2008 and 61/117, 237 filed Nov. 24, 2008, and to Korean Application Nos. 10-2009-0046246 filed May 27, 2009 and 10-2009-0057834 filed Jun. 26, 2009, all of which are incorporated herein by reference.

TECHNICAL FIELD

The present invention relates to wireless communications, and more particularly, to a method and an apparatus of transmitting information in a wireless communication system.

BACKGROUND ART

In next generation multimedia mobile communication systems, which have been actively studied in recent years, there is a demand for a system capable of processing and transmitting a variety of information (e.g., video and radio data) in addition to the early-stage voice service. Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as path loss, noise, fading due to multi-path, an inter-symbol interference (ISI), the Doppler effect due to mobility of a user equipment, etc. Therefore, various techniques have been developed to overcome the abnormal characteristic of the wireless channel and to increase reliability of wireless communication.

Multiple input multiple output (MIMO) is a technique for supporting reliable high-speed data services. The MIMO technique improves data transmission/reception efficiency by using multiple transmit antennas and multiple receive antennas. Examples of the MIMO technique include spatial multiplexing, transmit diversity, beamforming, etc. A MIMO channel matrix depending on the number of receive antennas and the number of transmit antennas can be decomposed into a plurality of independent channels. Each independent channel is referred to as a spatial layer or a stream. The number of streams is referred to as a rank.

As a mobile communication system of a next generation (i.e., post-3rd generation), an international mobile telecommunication-advanced (IMT-A) system is standardized aiming at support of an Internet protocol (IP)-based seamless multimedia service in an international telecommunication union (ITU) by providing a high-speed transmission rate of 1 gigabits per second (Gbps) in downlink communication and 500 megabits per second (Mbps) in uplink communication. In a 3rd generation partnership project (3GPP), a 3GPP long term evolution-advanced (LTE-A) system is considered as a candidate technique for the IMT-A system. The LTE-A system is evolved to increase a completion level of the LTE system, and is expected to maintain backward compatibility with the LTE system. This is because the provisioning of compatibility between the LTE-A system and the LTE system is advantageous in terms of user convenience, and is also advantageous for a service provider since existing equipment can be reused.

Meanwhile, various uplink control information are transmitted on an uplink control channel. Examples of the uplink control information include a hybrid automatic repeat request (HARQ) acknowledgement (ACK)/not-acknowledgement (NACK), a channel quality indicator (CQI) indicating downlink channel quality, a scheduling request (SR) requesting resource allocation for uplink transmission, etc.

A plurality of UEs in a cell may simultaneously transmit uplink information to a base station (BS). The BS must be able to distinguish the uplink information simultaneously transmitted from the respective UEs. When the uplink information of the respective UEs are transmitted using different frequencies, the BS can distinguish the uplink information. A scheme of multiplexing a plurality of UEs by using mutually different frequencies is called frequency division multiplexing (FDM). The plurality of UEs in the cell may transmit the uplink information to the BS by using the same time-frequency resource. To distinguish the uplink information transmitted from the respective UEs by using the same time-frequency resource, the respective UEs may use orthogonal sequences in the transmission of the uplink information. Alternatively, the UEs may use low correlation sequences. As such, a scheme of multiplexing a plurality of UEs by using mutually different sequences is called code division multiplexing (CDM). Namely, uplink information of each UE may be multiplexed according to the CDM and/or FDM scheme and transmitted. In this respect, however, combining of the information transmission method based on the CDM scheme to a MIMO technique may cause a problem in that orthogonality is broken. With the orthogonality broken, it is more difficult for the BS to discriminate information of each UE than when the orthogonality is maintained. Thus, the reliability of wireless communication may deteriorate, and the overall system performance may be degraded.

Accordingly, there is a need for a method and an apparatus of effectively transmitting information by combining the MIMO technique and the CDM scheme and/or FDM scheme.

DISCLOSURE OF INVENTION

Technical Problem

The present invention provides a method and an apparatus of transmitting information in a wireless communication system.

Solution to Problem

In an aspect, a method of transmitting information in a wireless communication system, carried in a transmitter, is provided. The method includes transmitting information based on a first resource index through a first antenna and transmitting the information based on a second resource index through a second antenna.

Preferably, the first resource index and the second resource index may be different.

Preferably, the first resource index may indicate a first cyclic shift (CS) index and a first resource block (RB), and the second resource index indicates a second CS index and a second RB.

Preferably, the transmitting of the information through the first antenna may include generating a first cyclically shifted sequence by cyclically shifting a base sequence by a first CS amount obtained from the first CS index, generating a first modulated sequence based on the first cyclically shifted sequence and a symbol for the information and transmitting the first modulated sequence through the first antenna after mapping the first modulated sequence to the first RB, and the transmitting of the information through the second antenna may include generating a second cyclically shifted sequence by cyclically shifting the base sequence by a second CS amount obtained from the second CS index, generating a second modulated sequence based on the second cyclically shifted sequence and the symbol for the information and transmitting the second modulated sequence through the second antenna after mapping the second modulated sequence to the second RB.

Preferably, the first modulated sequence and the second modulated sequence may be simultaneously transmitted.

Preferably, the first resource index may be received from a base station (BS), and the second resource index may be acquired from the first resource index.

Preferably, each of the first resource index and the second resource index may be received from a BS.

Preferably, the each of the first resource index and the second resource index may be configured by radio resource control (RRC) signaling.

Preferably, the first CS index and the second CS index may be different, and the first RB and the second RB may be the same.

Preferably, the first CS index and the second CS index may be the same, and the first RB and the second RB may be different.

The method may further include receiving data, wherein the information may be a hybrid automatic repeat request (HARQ) acknowledgement (ACK)/not-acknowledgement (NACK) for the data.

Preferably, the first resource index may be acquired from a radio resource for a physical control channel to receive the data, and the second resource index may be acquired from the first resource index.

Preferably, a spatial multiplexing rate of the information may be ½.

In another aspect, an apparatus for a wireless communication is provided. The apparatus includes a radio frequency (RF) unit transmitting and/or receiving a radio signal and a processor coupled with the RF unit and configured to transmit information based on a first resource index through a first antenna and transmit the information based on a second resource index through a second antenna.

Advantageous Effects of Invention

A method and an apparatus of effectively transmitting information are provided. Accordingly, overall system performance can be improved.

MODE FOR THE INVENTION

The technique described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The SC-FDMA is a scheme by which inverse fast Fourier transform is performed on complex symbols which have been DFT (discrete Fourier transform)-spread, which is also called DFT spread-orthogonal frequency division multiplexing (DFTS-OFDM). The following technique may be used for a multi-access scheme such as clustered SC-FDMA, N×SC-FDMA, modifications of the SC-FDMA. The clustered SC-FDMA, which is also called clustered DFTS-OFDM, is a scheme by which the DFT-spread complex symbols are divided into a plurality of subblocks, and the subblocks are distributed in a frequency domain so as to be mapped to subcarriers. The N×SC-FDMA is a scheme by which a code block is divided into a plurality of chunks, and DFT and IFFT are performed by the respective chunks, which is also called chunk specific DFTS-OFDM.

The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE.

For clarity, the following description will focus on the 3GPP LTE/LTE-A. However, the technical features of the present invention are not limited thereto.

Figure 1:
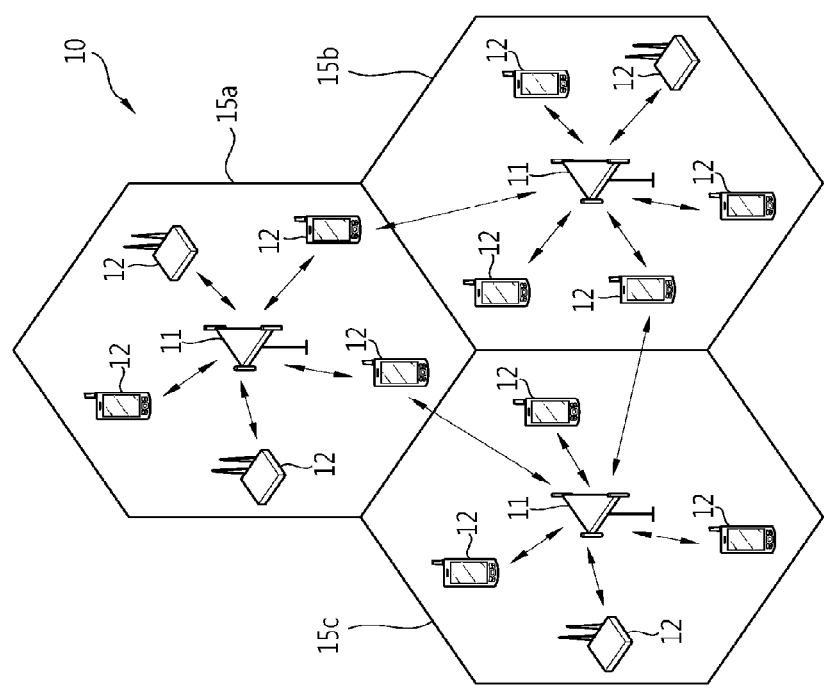
FIG. 1 is a block diagram showing a wireless communication system.

FIG. 1 is a block diagram showing a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

A heterogeneous network means a network in which a relay station, a femto cell and/or a pico cell, etc. are deployed. In the heterogeneous network, a DL may denote communication from the BS to a relay station, a femto cell or a pico cell. The DL may also denote communication from the relay station to the UE. In addition, the DL also may denote from a first relay station to a second relay station for multi-hop relay. In the heterogeneous network, a UL may denote communication from the relay station, the femto cell, or the pico cell to the BS. The UL may also denote communication from the UE to the relay station. In addition, the UL may also denote from the second relay station to the first relay station for multi-hop relay.

The wireless communication system may be one of a multiple input multiple output (MIMO) system, a multiple input single output (MISO) system, a single input single output (SISO) system, and a single input multiple output (SIMO) system. The MIMO system uses a plurality of transmit antennas and a plurality of receive antennas. The MISO system uses a plurality of transmit antennas and a single receive antenna. The SISO system uses a single transmit antenna and a single receive antenna. The SIMO system uses a single transmit antenna and a plurality of receive antennas.

Hereinafter, a transmit antenna refers to a physical or logical antenna used to transmit a signal or a stream, and a receive antenna refers to a physical or logical antenna used to receive a signal or a stream.

The wireless communication system can support a UL and/or DL hybrid automatic repeat request (HARQ). In addition, a channel quality indicator (CQI) can be used for link adaptation.

Figure 2:
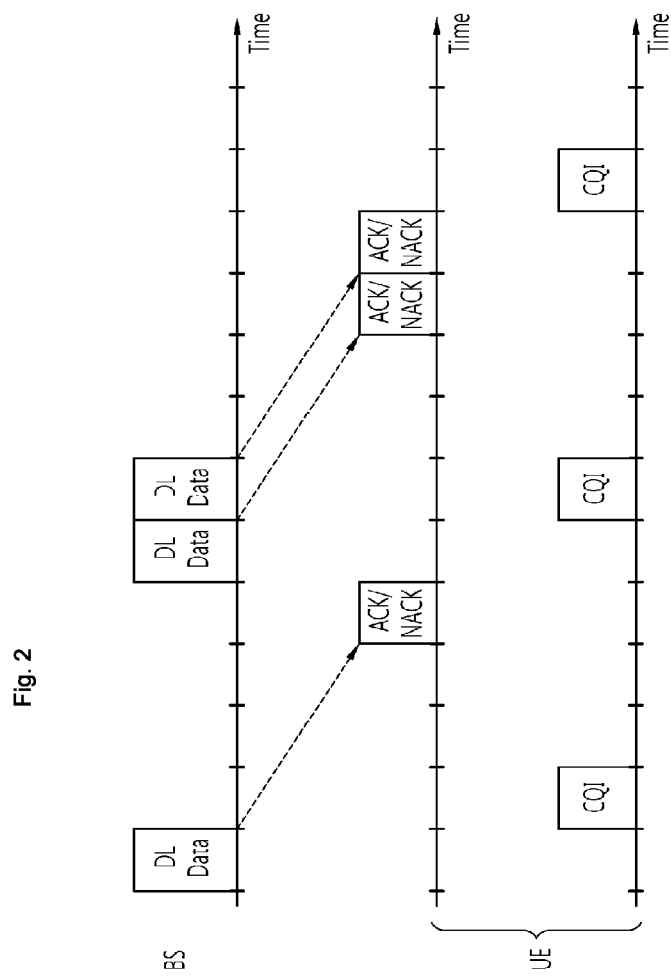
FIG. 2 shows transmission of a hybrid automatic repeat request (HARQ) acknowledgement (ACK)/not-acknowledgment (NACK) and a channel quality indicator (CQI).

FIG. 2 shows transmission of an HARQ acknowledgement (ACK)/not-acknowledgment (NACK) and a CQI.

Referring to FIG. 2, upon receiving DL data from a BS, a UE transmits the HARQ ACK/NACK after a specific time elapses. The DL data may be transmitted on a physical downlink shared channel (PDSCH) indicated by a physical downlink control channel (PDCCH). The HARQ ACK/NACK is ACK if the DL data is successfully decoded. The HARQ ACK/NACK is NACK if the DL data is unsuccessfully decoded. Upon receiving the NACK, the BS can retransmit the DL data until the ACK is received or until retransmission is performed the number of times corresponding to a maximum number of retransmissions.

A transmission time of the HARQ ACK/NACK with respect to the DL data, resource allocation information for transmission of the HARQ ACK/NACK, and the like, may be dynamically informed by the BS via signaling. Otherwise, the transmission time of the HARQ ACK/NACK, the resource allocation information, and the like, may be previously agreed depending on a transmission time of the DL data or resources used for transmission of the DL data. For example, in a frequency division duplex (FDD) system, if the PDSCH is received in an nth subframe, the HARQ ACK/NACK for the PDSCH can be transmitted on a physical uplink control channel (PUCCH) in an (n+4)th subframe.

The UE can report a CQI periodically and/or aperiodically to the BS by measuring a DL channel condition. The BS can perform DL scheduling by using the CQI. The BS may determine a modulation and coding scheme (MCS) used for transmission by using the CQI received from the UE. If a channel state is determined to be good based on the CQI, the BS may increase a modulation order or a coding rate to increase a transmission rate. If a channel state is determined to be not good, the BS may lower the modulation order or the coding rate to lower the transmission rate. By lowering the transmission rate, a reception error rate can be lowered. The CQI may indicate a channel state with respect to the entire band and/or a channel state with respect to a portion of the entire band. The BS may inform the UE about the transmission time of the CQI or the resource allocation information for CQI transmission.

The UE can report a precoding matrix indicator (PMI), a rank indicator (RI), etc. in addition to the CQI. The PMI indicates index of precoding matrix selected from a codebook. The RI indicates the number of useful transmission layers. Hereinafter, the CQI is a concept comprising the PMI and RI in addition to the CQI.

Figure 3:
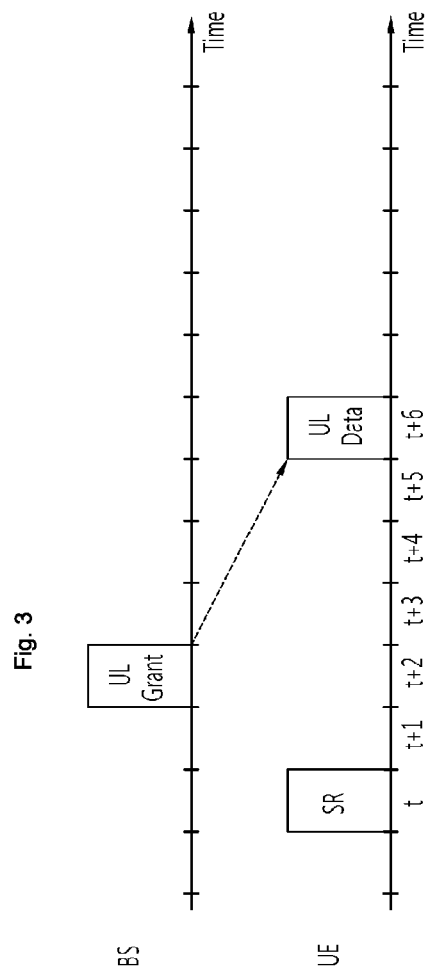
FIG. 3 shows uplink transmission.

FIG. 3 shows UL transmission.

Referring to FIG. 3, for UL transmission, a UE first transmits a scheduling request (SR) to a BS. The SR is used if the UE requests the BS to allocate a UL radio resource. The SR may be also referred to as a bandwidth request. The SR is a sort of preliminary information exchange for data exchange. In order for the UE to transmit UL data to the BS, radio resource allocation is first requested by using the SR. The BS can report an SR transmission time or resource allocation information for the SR to the UE. The SR may be transmitted periodically. The BS can report a transmission period of the SR to the UE.

In response to the SR, the BS transmits a UL grant to the UE. The UL grant may be transmitted on a PDCCH. The UL grant includes information for UL radio resource allocation. The UE transmits the UL data by using an allocated radio resource.

As shown in FIGS. 2 and 3, the UE can transmit UL control information (i.e., HARQ ACK/NACK, CQI, and SR) at a given transmission time. The type and size of the UL control information may vary depending on systems, and the technical features of the present invention are not limited thereto.

Figure 4:
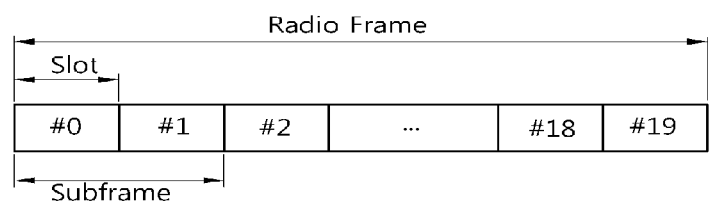
FIG. 4 shows a structure of a radio frame in a 3rd generation partnership project (3GPP) long term evolution (LTE).

FIG. 4 shows a structure of a radio frame in a 3GPP LTE.

Referring to FIG. 4, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is shown for exemplary purposes only. Thus, the number of subframes included in the radio frame or the number of slots included in the subframe may change variously.

Figure 5:
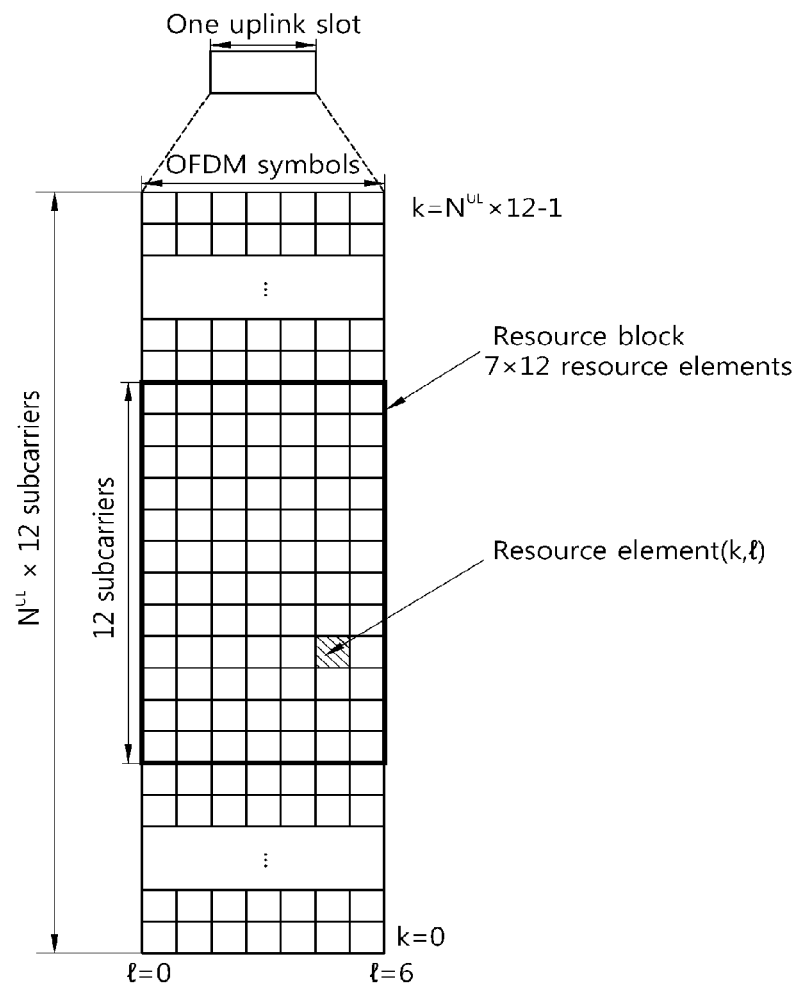
FIG. 5 shows an example of a resource grid for one uplink slot in a 3GPP LTE.

FIG. 5 shows an example of a resource grid for one UL slot in a 3GPP LTE.

Referring to FIG. 5, the UL slot includes a plurality of orthogonal frequency division multiplexing (OFDM) symbols in a time domain and resource blocks (RBs) in a frequency domain. The OFDM symbol is for expressing one symbol period. The OFDM symbol may be applied for the multi-access schemes such as OFDMA, SC-FDMA, clustered SC-FDMA, N×SC-FDMA, or the like. The OFDM symbol may be referred to as an SC-FDMA symbol, an ORDMA symbol, or a symbol period according to systems.

The RB includes a plurality of subcarriers in the frequency domain. The number of RBs $N^{UL}$ included in the UL slot depends on a UL transmission bandwidth configured in a cell.

Each element on the resource grid is referred to as a resource element. The resource element on the resource grid can be identified with an index pair (k, l) within a slot. Herein, $k(k=0, \ldots, N^{UL} \times 12-1)$ denotes a subcarrier index in the frequency domain, and $l(l=0, \ldots, 6)$ denotes a symbol index in the time domain.

Although it is described herein that one RB includes 7×12 resource elements consisting of 7 OFDM symbols in the time domain and 12 subcarriers in the frequency domain, this is for exemplary purposes only. Thus, the number of OFDM symbols and the number of subcarriers in the RB are not limited thereto. The number of subcarriers or the number of OFDM symbols included in the RB may change variously. Hereinafter, the RB means a general frequency resource. That is, if RBs are different, frequency resources are different. The number of OFDM symbols may change according to a length of a cyclic prefix (CP). For example, if a normal CP is used, the number of OFDM symbols is 7, and if an extended CP is used, the number of OFDM symbols is 6.

The resource grid for one UL slot for the 3GPP LTE of FIG. 5 can also apply to a resource grid for a DL slot.

Figure 6:
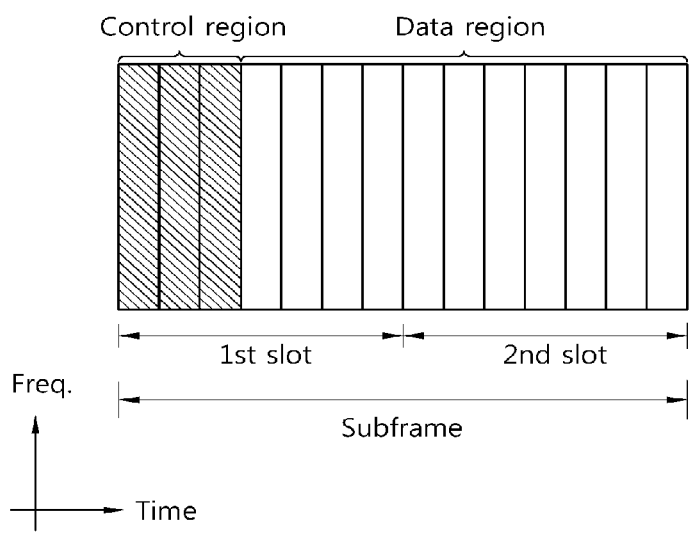
FIG. 6 shows an exemplary structure of a downlink subframe in a 3GPP LTE.

FIG. 6 shows an exemplary structure of a DL subframe in a 3GPP LTE.

Referring to FIG. 6, the DL subframe includes two consecutive slots. A maximum of three OFDM symbols located in a front portion of a 1st slot within the DL subframe correspond to a control region. The remaining OFDM symbols correspond to a data region.

A PDSCH may be allocated to a data region. DL data is transmitted on the PDSCH. The DL data may be a transport block, namely, a data block for a downlink shared channel (DL-SCH), a transport channel, transmitted during a TTI. The BS may transmit DL data to the UE on a single antenna or multiple antennas. In the 3GPP LTE, the BS may transmit one codeword to the UE on a single antenna or multiple antennas, and transmit two codewords to the UE on multiple antennas. Namely, in the 3GPP LTE, up to two codewords are supported. The codeword is coded bits obtained by channel coding on information bits corresponding to information. Modulation may be performed on every codeword.

Control channels such as a physical control format indicator channel (PCFICH), a physical hybrid ARQ indicator channel (PHICH), a PDCCH, etc., can be allocated to the control region.

The PCFICH carries information about the number of OFDM symbols used for transmission of PDCCHs in a subframe. Here, the inclusion of three OFDM symbols in a control region is merely illustrative. The PHICH carries HARQ ACK/NACK with respect to UL transmission.

The control region consists of a set of control channel elements (CCEs). The CCEs are indexed 0 to N(CCE)−1, where N(CCE) is the total number of CCEs constituting the set of CCEs in a DL subframe. The CCE corresponds to a plurality of resource element groups. The resource element groups are used for defining the mapping of a control channel to resource elements. One resource element group includes a plurality of resource elements. A PDCCH is transmitted on an aggregation of one or several consecutive CCEs. A plurality of PDCCHs may be transmitted in the control region.

The PDCCH carries DL control information such as DL scheduling information, UL scheduling information, UL power control command, or the like. If a BS transmits DL data to a UE on a PDSCH in a subframe, the BS carries DL information used for scheduling of the PDSCH on a PDCCH in the subframe. The UE may decode the DL control information to read the DL data transmitted on the PDSCH.

Figure 7:
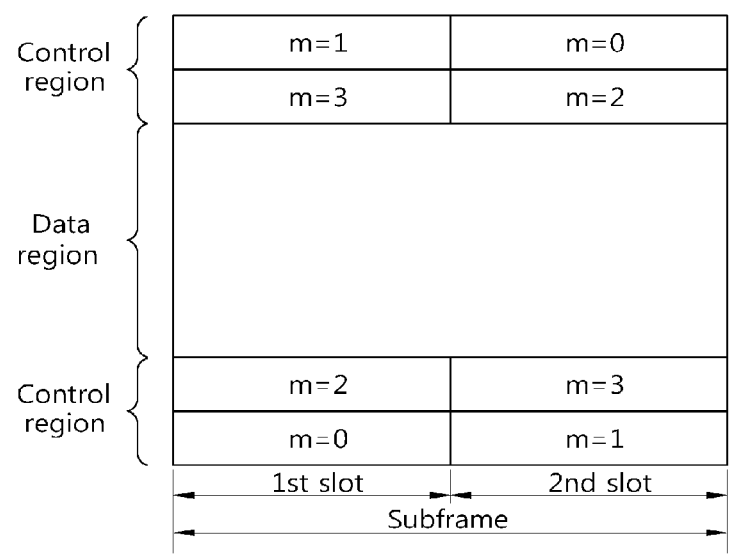
FIG. 7 shows an exemplary structure of an uplink subframe in a 3GPP LTE.

FIG. 7 shows an exemplary structure of a UL subframe in a 3GPP LTE.

Referring to FIG. 7, the UL subframe may be divided into a control region allocated to a PUCCH carrying UL control information and a data region allocated to a physical uplink shared channel (PUSCH) carrying UL data. To maintain a single carrier property in the 3GPP LTE (Release 8), RBs allocated to one UE are contiguous in a frequency domain. One UE cannot simultaneously transmit the PUCCH and the PUSCH. An LTE-A (Release 10) considers a concurrent transmission of the PUCCH and the PUSCH.

The PUCCH for one UE is allocated to an RB pair in a subframe. RBs belonging to the RB pair occupy mutually different subcarriers in each of a 1st slot and a 2nd slot. The frequency occupied by RBs belonging to the RB pair allocated to the PUCCH is changed based on a slot boundary. Namely, the RBs allocated to the PUCCH are hopped at a slot level. Hereinafter, RB hopping at a slot level will be referred to as frequency hopping. By transmitting, by the UE, the UL control information through mutually different frequency positions over time, a frequency diversity gain can be obtained. m denotes a location index indicating a logical frequency domain location of an RB pair allocated to the PUCCH in the subframe.

The PUSCH is mapped to an uplink shared channel (UL-SCH) that is a transport channel. Examples of UL control information transmitted on the PUCCH include HARQ ACK/NACK, a CQI indicating a DL channel condition, an SR that is a UL radio resource allocation request, etc.

The PUCCH can support multiple formats. That is, it is possible to transmit the UL control information whose number of bits per subframe differs according to the modulation scheme depending on the PUCCH formats' applications. The following table shows an example of a modulation scheme and the number of bits per subframe with respect to a PUCCH format.

TABLE 1

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

A PUCCH format 1 is used to transmit the SR. A PUCCH format 1a/1b is used to transmit the HARQ ACK/NACK. A PUCCH format 2 is used to transmit the CQI. A PUCCH format 2a/2b is used to transmit the CQI and the HARQ ACK/NACK.

In any subframe, if the HARQ ACK/NACK is transmitted alone, the PUCCH format 1a/1b is used, and if the SR is transmitted alone, the PUCCH format 1 is used. The UE can transmit the HARQ ACK/NACK and the SR at the same subframe simultaneously. For positive SR transmission, the UE transmits the HARQ ACK/NACK by using a PUCCH resource allocated for the SR. For negative SR transmission, the UE transmits the HARQ ACK/NACK by using a PUCCH resource allocated for the ACK/NACK.

Control information transmitted on the PUCCH can use a cyclically shifted sequence. The cyclically shifted sequence can be generated by cyclically shifting a base sequence by a specific cyclic shift (CS) amount. The specific CS amount is indicated by a CS index. Various types of sequences can be used as the base sequence. For example, well-known sequences (e.g., a pseudo-random (PN) sequence and a Zadoff-Chu (ZC) sequence) can be used as the base sequence. In addition, a constant amplitude zero auto-correlation (CAZAC) sequence generated by a computer can be used as the base sequence. The following equation shows an example of the base sequence.

MathFigure 1

$$r_i(n) = e^{jb(n)\pi/4} \quad \text{[Math. 1]}$$

Herein, $i \in \{0, 1, \ldots, 29\}$ denotes a root index, and n denotes an element index satisfying $0 \leq n \leq N-1$, where N is a length of the base sequence. i can be determined by a cell identifier (ID) and a slot number in a radio frame or the like. If one RB includes 12 subcarriers, N may be set to 12. A different base sequence is defined in accordance with a different root index. If N=12, b(n) can be defined by the following table.

TABLE 2

| i | b(0), . . . , b(11) | | | | | | | | | | | |
| --- | --- | --- | --- | --- | --- | --- | --- | --- | --- | --- | --- | --- |
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |

TABLE 2-continued

| i | b(0), . . . , b(11) | | | | | | | | | | | |
| --- | --- | --- | --- | --- | --- | --- | --- | --- | --- | --- | --- | --- |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

A cyclically shifted sequence r(n, Ics) can be generated by cyclically shifting a base sequence r(n) according to the following equation.

MathFigure 2

$$r(n, I_{cs}) = r(n) \cdot \exp\left(\frac{j2\pi I_{cs} n}{N}\right), \quad 0 \leq I_{cs} \leq N-1 \quad \text{[Math. 2]}$$

Herein, Ics denotes a CS index indicating a CS amount ($0 \leq Ics \leq N-1$, where Ics is an integer).

Hereinafter, an available CS index of the base sequence means a CS index that can be derived from the base sequence according to a CS interval. For example, if the base sequence has a length of 12 and the CS interval is 1, the total number of available CS indices of the base sequence is 12. If the base sequence has a length of 12 and the CS interval is 2, the total number of available CS indices of the base sequence is 6. The CS interval can be determined by considering a delay spread.

Figure 8:
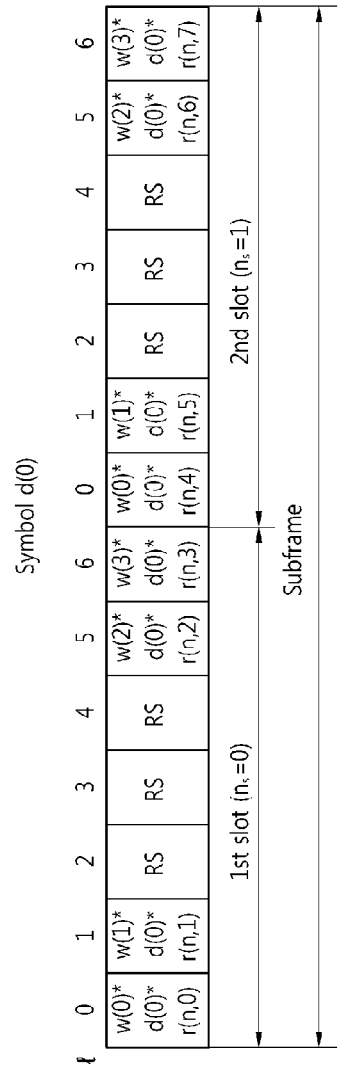
FIG. 8 shows an example of physical uplink control channel (PUCCH) format 1/1a/1b transmission if a normal cyclic prefix (CP) is used.

FIG. 8 shows an example of PUCCH format 1/1a/1b transmission if a normal CP is used. Herein, an RB pair allocated to a 1st slot and a 2nd slot in one subframe is shown. Here, the RBs belonging to the RB pair are shown to occupy the same frequency band in the 1st slot and 2nd slot, but as described above with reference to FIG. 7, the RBs may be hopped at a slot level.

Referring to FIG. 8, each of the 1st slot and the 2nd slot includes 7 OFDM symbols. Among the 7 OFDM symbols of each slot, a reference signal (RS) is carried in 3 OFDM symbols, and control information is carried in the remaining 4 OFDM symbols. The RS is carried in 3 contiguous OFDM symbols positioned in a middle portion of each slot. In this case, the position and the number of symbols used for the RS may vary, and thus the position and the number of symbols used for the control information may also vary.

Each of the PUCCH formats 1, 1a, and 1b uses one complex-valued symbol d(0). A BS can detect an SR according to presence/absence of PUCCH format 1 transmission from a UE. Namely, an on-off keying (OOK) modulation scheme may be used for SR transmission. Thus, an arbitrary complex may be used as a value of a complex-valued symbol d(0) for a PUCCH format 1. For example, d(0)=1 may be used. The complex-valued symbol d(0) for a PUCCH format 1a is a modulation symbol generated as 1-bit HARQ ACK/NACK information is binary phase shift keying (BPSK) modulated. The complex-valued symbol d(0) for a PUCCH format 1b is a modulation symbol generated as 2-bit HARQ ACK/NACK information is quadrature phase shift keying (QPSK) modulated. The PUCCH format 1a is for HARQ ACK/NACK information regarding one codeword, and the PUCCH format 1b is for HARQ ACK/NACK information regarding two codewords.

The following table shows an example of modulation symbols to which HARQ ACK/NACK information bits are mapped according to modulation schemes.

TABLE 3

| Modulation scheme | Information bit(s) | d(0) |
|---|---|---|
| BPSK | 0 | 1 |
|  | 1 | −1 |
| QPSK | 00 | 1 |
|  | 01 | −j |
|  | 10 | j |
|  | 11 | −1 |

A modulated sequence s(n) is generated based on the complex-valued symbol d(0) for the PUCCH format 1/1a/1b and the cyclically shifted sequence r(n,Ics). The modulated sequence y(n) can be generated by multiplying the complex-valued symbol d(0) by the cyclically shifted sequence r(n, Ics) according to the following equation.

MathFigure 3

$$s(n)=d(0)r(n,I_{cs}) \quad \text{[Math. 3]}$$

A CS index Ics of the cyclically shifted sequence r(n,Ics) may be hopped at a symbol level, starting from the allocated resources. Hereinafter, hopping of the CS index at the symbol level will be referred to as CS hopping. The CS hopping may be performed according to a slot number $n_s$ in a radio frame and a symbol index l in a slot. Thus, the CS index Ics can be expressed by Ics($n_s$,l). The CS hopping may be cell-specifically performed to randomize inter-cell interference. Herein, a slot number of the 1st slot is set to 0, a slot number of the 2nd slot is set to 1, and the CS indices are set to Ics(0,0)=0, Ics(0,1)=1, Ics(0,5)=2, Ics(0,6)=3, Ics(1,0)=4, Ics(1,1)=5, Ics(1,5)=6, and Ics(1,6)=7. However, this is for exemplary purposes only.

To increase UE multiplexing capacity, the modulated sequence s(n) can be spread by using an orthogonal sequence (OS). The UE multiplexing capacity is the number of UEs that can be multiplexed to the same RB.

Herein, the modulated sequence s(n) is spread with an OS w(k) having a spreading factor of K=4 with respect to 4 OFDM symbols for carrying a control signal within one slot. An OS $w_{Ios}(k)$ having a spreading factor of K=4 (where Ios is an OS index, and k satisfying 0≤k≤K−1 is an element index of the OS) can use a sequence shown in the following table.

TABLE 4

| Orthogonal sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Elements constituting an OS correspond in a one-to-one manner to OFDM symbols in which control information is carried by turns. A spread sequence is generated by multiplying each of the elements constituting the OS by a modulated sequence s(n) carried in corresponding OFDM symbol. The spread sequence is mapped to the RB pair allocated to the PUCCH in the subframe. After the spread sequence is mapped to the RB pair, IFFT is performed on each OFDM symbol of the subframe to output a time domain signal with respect to the control information. Here, the OS is multiplied before IFFT is performed, but the same results can be obtained even if the OS is multiplied after IFFT is performed on the modulated sequence s(n).

Alternatively, an OS $w_{Ios}(k)$ having a spreading factor of K=3 (where Ios is an OS index, and k satisfying 0≤k≤K−1 is an element index of the OS) can use a sequence shown in the following table.

TABLE 5

| Orthogonal sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

If a sounding reference signal (SRS) and the PUCCH format 1/1a/1b are simultaneously transmitted in a subframe, one OFDM symbol on PUCCH is punctured. For example, the last OFDM symbol of the subframe may be punctured. In this case, control information is carried in 4 OFDM symbols in the 1st slot of the subframe, and control information is carried in 3 OFDM symbols in the 2nd slot of the subframe. Accordingly, an OS having a spread coefficient K=4 is used for the 1st slot, and an OS having a spread coefficient K=3 is used for the 2nd slot.

An OS index Ios may be hopped at a slot level, starting from allocated resources. Hereinafter, hopping of OS index at the slot level will be referred to as OS remapping. The OS remapping may be performed according to a slot number $n_s$ in a radio frame. Thus, the OS index Ios can be expressed as Ios($n_s$). The OS remapping may be performed to randomize inter-cell interference.

The modulated sequence s(n) may be scrambled in addition to being spread with the OS. For example, the modulated sequence y(n) may be multiplied by 1 or j according to a specific parameter.

The RS can be generated based on the OS and the cyclically shifted sequence generated from the same base sequence as the control information. The cyclically shifted sequence can be used as the RS by spreading the cyclically shifted sequence with the OS w(k) having a spreading factor of K=3. Therefore, in order for a UE to transmit control information, in addition to an OS index and a CS index for the control information, an OS index and a CS index for an RS are also required.

Figure 9:
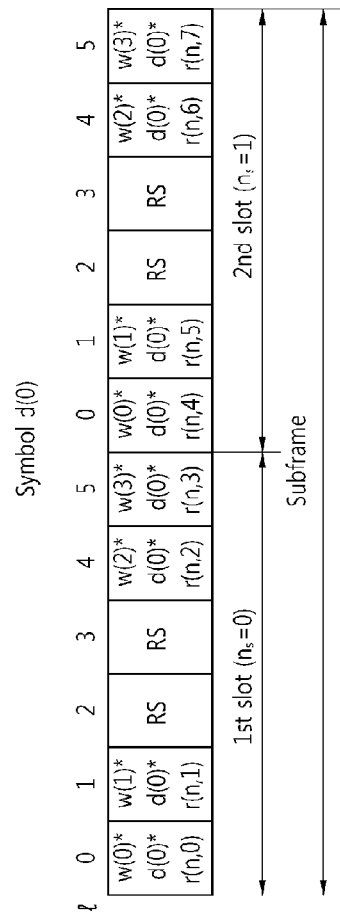
FIG. 9 shows an example of PUCCH format 1/1a/1b transmission when an extended CP is used.

FIG. 9 shows an example of PUCCH format 1/1a/1b transmission when an extended CP is used. Here, RBs belonging to an RB pair are shown to occupy the same frequency band in a 1st slot and a 2nd slot, but as described above with reference to FIG. 7, the RBs may be hopped at a slot level.

Referring to FIG. 9, each of the 1st slot and the 2nd slot includes 6 OFDM symbols. Among the 6 OFDM symbols of each slot, an RS is carried in 2 OFDM symbols, and control information is carried in the remaining 4 OFDM symbols. Other than that, the example of FIG. 8 in which the normal CP is used may be applied without alteration. However, the RS can be used by spreading the cyclically shifted sequence with the OS w(k) having a spreading factor of K=2.

An OS $w_{Ios}(k)$ having a spreading factor of K=2 (where Ios is an OS index, and k satisfying $0 \le k \le K-1$ is an element index of the OS) can use a sequence shown in the following table.

Figure 10:
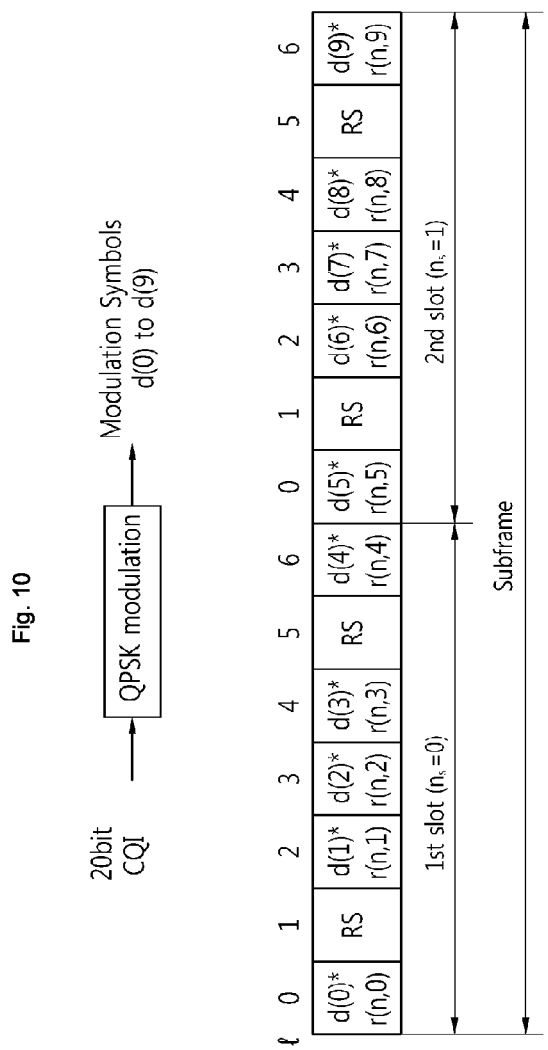
FIG. 10 shows an example of PUCCH format 2/2a/2b transmission when a normal CP is used.

Referring to FIG. 10, among 7 OFDM symbols included in each slot, an RS is carried in 2 OFDM symbols, and a CQI is carried in the remaining 5 OFDM symbols. In this case, the position and the number of symbols used for the RS may differ, and thus the position and the number of symbols used for the CQI may also differ.

The UE performs channel coding on CQI information bits to generate coded CQI bits. In this case, a block code may be used. The block code may be, for example, a Reed-Muller code family. In the 3GPP LTE, a (20, A) block code is used. Here, 'A' is the size of the CQI information bits. Namely, in the 3GPP LTE, 20 coded CQI bits are always generated regardless of the size of the CQI information bits.

The following table shows an example of 13 basis sequences for the (20, A) block code.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 6

| Orthogonal sequence index | [w(0), w(1)] |
|---|---|
| 0 | [1 1] |
| 1 | [1 −1] |
| 2 | N/A |

As described above, in case of the normal CP or the extended CP, the following information is required to transmit the PUCCH format 1/1a/1b: subcarriers (or an RB) on which control information is transmitted, a CS index Ics and an OS index Ios for the control information, and a CS index I'cs and an OS index I'os for an RS. For example, if the CS interval is 2 in the extended CP, the UE multiplexing capacity is as follows: Because the number of Ics is 6 and the number of Ios is 3 for the control information, 18 UEs per one RB can be multiplexed. Meanwhile, the number of I'cs is 6 and the number of I'os is 2 for the RS, twelve UEs per the one RB can be multiplexed. Thus, the UE multiplexing capacity is limited by the RS part, rather than the control information part.

FIG. 10 shows an example of PUCCH format 2/2a/2b transmission when a normal CP is used. Here, RBs belonging to an RB pair are shown to occupy the same frequency band in a 1st slot and a 2nd slot, but as described above with reference to FIG. 7, the RBs may be hopped at a slot level.

Here, $M_{i,n}$ is a basis sequence ($0 \le n \le 12$, where n is integer). The coded CQI bits are generated through a linear combination of the 13 basis sequences. The following equation shows an example of the coded CQI bits $b_i$ ($0 \le i \le 19$, where i is integer).

MathFigure 4

$$b_i = \sum_{n=0}^{A-1} (a_n \cdot M_{i,n}) \bmod 2 \qquad \text{[Math. 4]}$$

Here, $a_0, a_1, \ldots, a_{A-1}$ are CQI information bits, and A is the size of the CQI information bits (where A is natural number).

The CQI information bits may include one or more fields. For example, the CQI information bits may include a CQI field indicating a CQI index that determines an MCS, a precoding matrix indication (PMI) field indicating an index of a precoding matrix selected from a codebook, a rank indication (RI) field indicating a rank, and the like.

The following table shows an example of a field included in the CQI information bits and a bit size of the field.

TABLE 8

| Field | Size(bit) |
|---|---|
| Wideband CQI | 4 |

The CQI information bits may include only 4-bit wideband CQI field. In this case, the size A of the CQI information bits is 4. The wideband CQI field indicates a CQI index with respect to the entire band.

The following table shows another example of fields included in the CQI information bits and a bit size of the fields.

TABLE 9

| | Size(bit) | | | |
|---|---|---|---|---|
| | 2 antennas | | 4 antennas | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| Preceding matrix indication | 2 | 1 | 4 | 4 |

The CQI information bits may include the wideband CQI field, a spatial differential CQI field, and a PMI field. The spatial differential CQI field indicates the difference between a CQI index with respect to the entire band for a 1st codeword and a CQI index with respect to the entire band for a 2nd codeword. The size of each field may vary depending on the number of transmit antennas of the BS and rank. For example, if the BS uses 4 transmit antennas and the rank is larger than 1, the CQI information bits include 4-bit wideband CQI field, 3-bit spatial differential CQI field, and 4-bit PMI field (A=11).

The following table shows still another example of a field included in the CQI information bits and a bit size of the field.

TABLE 10

| | Size(bit) | | |
|---|---|---|---|
| | | 4 antennas | |
| Field | 2 antennas | Max 2 layers | Max 4 layers |
| Rank indication | 1 | 1 | 2 |

20 coded CQI bits may be scrambled with a UE-specific scrambling sequence to generate 20 scrambled bits. The 20 scrambled bits are mapped to 10 complex-valued modulation symbols d(0) to d(9) by QPSK modulation. In the PUCCH format 2a, 1-bit HARQ ACK/NACK information is mapped to one complex-valued modulation symbol d(10) by BPSK modulation. In the PUCCH format 2b, 2-bit HARQ ACK/NACK information is mapped to one complex-valued modulation symbol d(10) by QPSK modulation. Namely, in the PUCCH format 2a, the CQI and the 1-bit HARQ ACK/NACK information are simultaneously transmitted, and in the PUCCH format 2b, the CQI and the 2-bit HARQ ACK/NACK information are simultaneously transmitted. Here, d(10) is used in the generation of the RS. The d(10) corresponds to one OFDM symbol between 2 OFDM symbols in which the RS is carried in each slot. In other words, phase modulation is performed on 2nd RS carried in the one OFDM symbol in each slot according to corresponding d(10). The PUCCH format 2a/2b can be supported for normal CP only. As such, in each of the PUSCH formats 2a and 2b, one complex-valued modulation symbol is used to generate the RS.

A modulated sequence is generated based on the complex-valued modulation symbols d(0) to d(9) and the cyclically shifted sequence r(n,Ics) generated from the base sequence. A CS index Ics of the cyclically shifted sequence r(n,Ics) may differ according to a slot number $n_s$ in a radio frame and a symbol index l in a slot. Therefore, the CS index Ics can be expressed by Ics($n_s$,l). Herein, a slot number of a 1st slot is set to 0, a slot number of a 2nd slot is set to 1, and the CS indices are set to Ics(0,0)=0, Ics(0,2)=1, Ics(0,3)=2, Ics(0,4)=3, Ics(0,6)=4, Ics(1,0)=5, Ics(1,2)=6, Ics(1,3)=7, Ics(1,4)=8, and Ics(1,6)=9. However, this is for exemplary purposes only. The RS can use the cyclically shifted sequence generated from the same base sequence as the control information.

Unlike in the PUCCH format 1/1a/1b, the PUCCH format 2/2a/2b does not use an OS.

Figure 11:
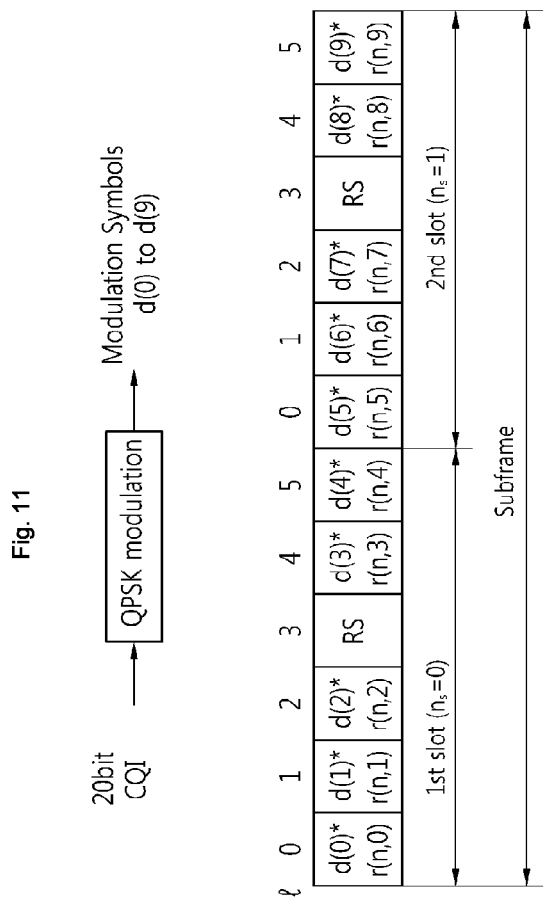
FIG. 11 shows an example of PUCCH format 2/2a/2b transmission when an extended CP is used.

FIG. 11 shows an example of PUCCH format 2/2a/2b transmission when an extended CP is used. Here, RBs belonging to an RB pair are shown to occupy the same frequency band in a 1st slot and a 2nd slot, but as described above with reference to FIG. 7, the RBs may be hopped at a slot level.

Referring to FIG. 11, each of the 1st slot and the 2nd slot includes 6 OFDM symbols. Among the 6 OFDM symbols of each slot, an RS is carried in one OFDM symbol, and control information is carried in the remaining 5 OFDM symbols. Other than that, the example of FIG. 10 in which the normal CP is used may be applied without alteration.

As described above, in case of the normal CP or the extended CP, the following information is required to transmit the PUCCH format 2/2a/2b: subcarriers (or an RB) on which control information is transmitted, a CS index Ics for the control information, and a CS index I'cs for an RS. For example, if the CS interval is 1, each of the number of Ics for the control information and the number of I'cs for the RS is 12, and 12 UEs per one RB can be multiplexed. If the CS interval is 2, each of the number of Ics for the control information and the number of I'cs for the RS is 6, and 6 UEs per one RB can be multiplexed.

Figure 12:
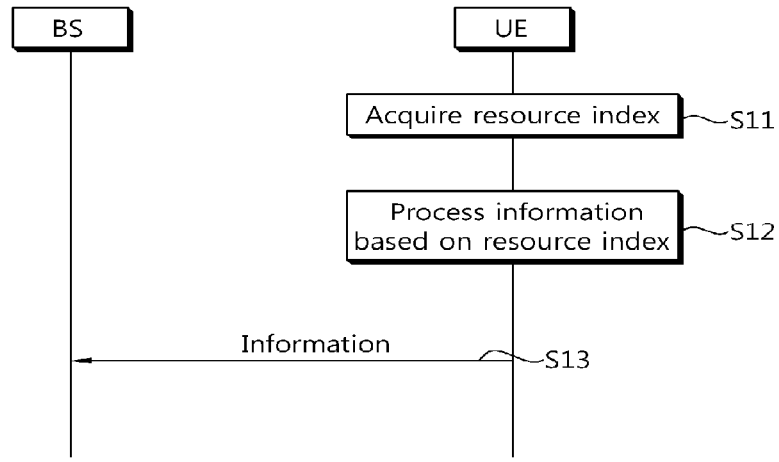
FIG. 12 is a flow diagram showing an example of a method of transmitting information.

FIG. 12 is a flow diagram showing an example of a method of transmitting information.

Referring to FIG. 12, a UE acquires a resource index (S11). The UE processes information based on the resource index (S12). The UE transmits the information to a BS (S13).

A plurality of UEs in a cell can simultaneously transmit respective information to the BS. In this case, if each UE uses a mutually different resource, the BS could discriminate the information of each UE.

The resource may include one or more of an RB, a frequency domain sequence, and a time domain sequence. The RB is a frequency resource on which the information is transmitted. The frequency domain sequence is used to spread symbol corresponding to the information in a frequency domain. The time domain sequence is used to spread the symbol in a time domain. If the resource includes the frequency domain sequence and the time domain sequence, the frequency domain sequence and the time domain sequence are used to spread the symbol in a two-dimensional time-frequency domain (frequency domain and time domain).

The resource index identifies the resource used for information transmission. The resource index may include one or more of RB information, a frequency domain sequence index, and a time domain sequence index. The RB information indicates the RB, the frequency domain sequence index indicates the frequency domain sequence, and the time domain sequence index indicates the time domain sequence. For example, if a resource includes an RB and a frequency domain sequence, a resource index may include RB information and a frequency domain sequence index.

A sequence used as the frequency domain sequence and/or time domain sequence will now be described. The sequence can be selected from a sequence set including a plurality of sequences as elements. The plurality of the sequences included the sequence set may be mutually orthogonal, or have low correlation with one another.

If a resource includes a sequence, a resource index may include a sequence index. The sequence may be generated based on the sequence index. Hereinafter, the sequence is a frequency domain sequence and/or a time domain sequence.

For example, the sequence index may indicate one sequence selected from the sequence set. Each of the plurality of the sequences included the sequence set may correspond to one sequence index in a one-to-one manner.

For another example, the sequence index may indicate a CS amount, and the sequence may be generated by cyclically shifting a base sequence by the CS amount.

Hereinafter, it is assumed that the time domain sequence is an OS selected from a set of OSs and the frequency domain sequence is a cyclically shifted sequence generated by cyclically shifting a basis sequence by a CS amount. In this case, a time domain sequence index may be an OS index indicating the OS, and a frequency domain sequence index may be a CS index indicating the CS amount. However, this is merely illustrative, and the time domain sequence and/or the frequency domain sequence are not limited.

In case of the PUCCH format 1/1a/1b, a resource may be constituted as a combination of (1) a CS amount, (2) an OS, and (3) an RB. A resource index indicates a CS index, an OS index, and the RB. For example, if the number of CS indices is 6, the number of OS indices is 3, and the number of RBs is 3, then the total number of resources would be 54 (=6×3×3). The 54 resources can be indexed from 0 to 53. Each of the 54 resources can be allocated to mutually different UEs.

In case of the PUCCH format 2/2a/2b, a resource may be constituted as a combination of (1) a CS amount, and (2) an RB. A resource index indicates a CS index and the RB. For example, if the number of CS indices is 6 and the number of RBs 2, then the total number of resources would be 12 (=6×2). The 12 resources can be indexed from 0 to 11. Each of the 12 resources can be allocated to mutually different UEs.

In this manner, the CS index and the RB are determined from the resource index. In case of the PUCCH format 1/1a/1b, the OS index is also determined from the resource index. For example, a location index m indicating a logical frequency domain location of an RB pair allocated to a PUCCH in a subframe can be determined from the resource index.

Figure 13:
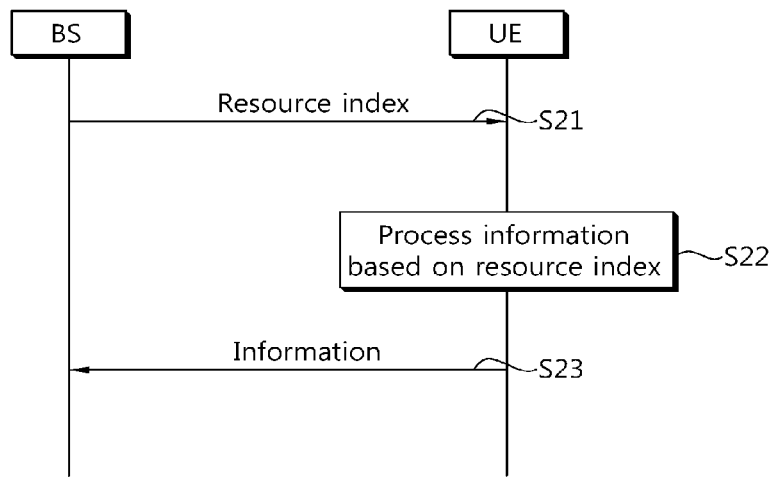
FIG. 13 is a flow diagram showing another example of a method of transmitting information.

FIG. 13 is a flow diagram showing another example of a method of transmitting information.

Referring to FIG. 13, a BS transmits a resource index to a UE (S21). The UE processes information based on the resource index (S22). The UE transmits the information to the BS (S23). As such, the BS can explicitly inform the UE of the resource index. The resource index may be configured by higher layer signaling. For example, the higher layer of a physical layer may be a radio resource control (RRC) layer controlling radio resources between the UE and a network. In this case, the information transmitted by the UE may be an SR, a semi-persistent scheduling (SPS) ACK/NACK, a CQI, and the like. The SPS ACK/NACK is an HARQ ACK/NACK with respect to DL data transmitted according to semi-static scheduling. If the DL data is transmitted on a PDSCH, a PDCCH corresponding to the PDSCH may not exist.

Figure 14:
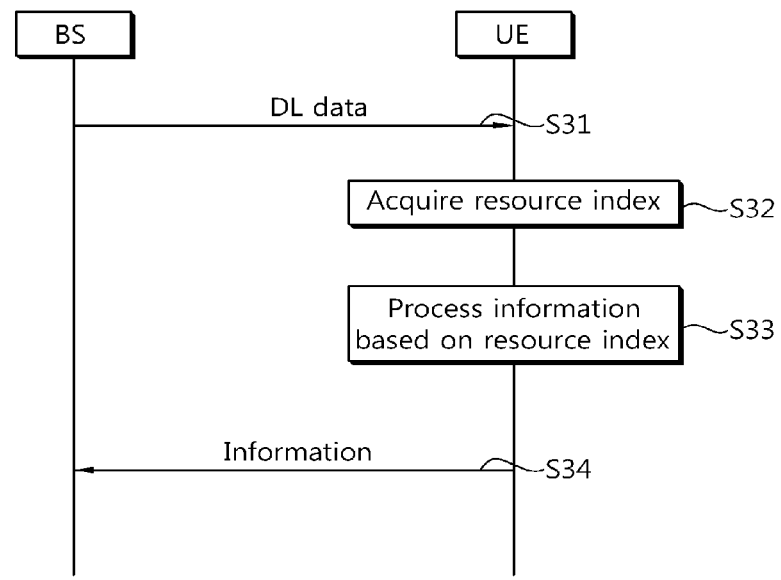
FIG. 14 is a flow diagram showing still another example of a method of transmitting information.

FIG. 14 is a flow diagram showing still another example of a method of transmitting information.

Referring to FIG. 14, a BS transmits DL data to a UE (S31). The UE acquires a resource index (S32). In this case, the resource index can be obtained from a radio resource on which a control channel for receiving the DL data is transmitted. The UE processes information based on the resource index (S33). The UE transmits the information to the BS (S34). As such, the BS can implicitly inform the UE of the resource index. In this case, the information transmitted by the UE is a dynamic ACK/NACK. The dynamic ACK/NACK is an HARQ ACK/NACK with respect to DL data transmitted according to dynamic scheduling. The dynamic scheduling is that whenever the BS transmits the DL data on a PDSCH, it transmits a DL grant to the UE on the PDCCH.

The following equation shows an example of determining a resource index (In) for transmission of the dynamic ACK/NACK.

MathFigure 5

$$In = n(CCE) + N_{PUCCH}^{(1)}$$ [Math. 5]

Here, n(CCE) is the first CCE index used for PDCCH transmission with respect to the PDSCH, and $N^{(1)}_{PUCCH}$ is the number of resource indices allocated for an SR and an SPS ACK/NACK. $N^{(1)}_{PUCCH}$ can be configured by a higher layer such as an RRC layer.

Accordingly, the BS can adjust a resource for ACK/NACK transmission by adjusting the first CCE index used for the PDCCH transmission.

Figure 15:
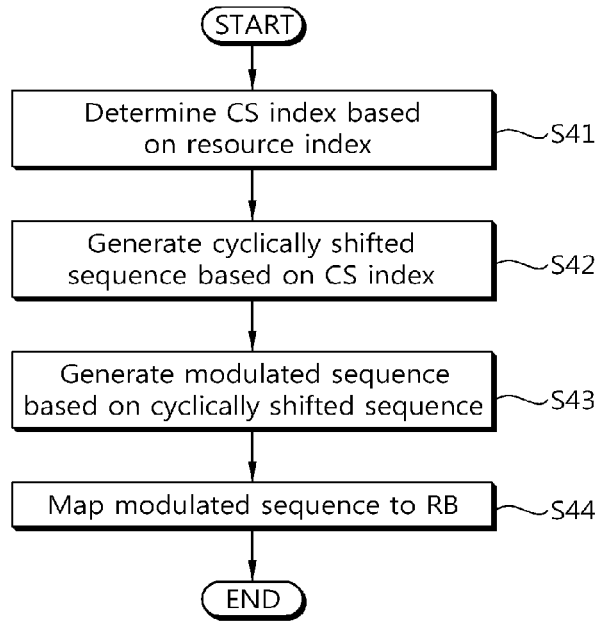
FIG. 15 is a flow chart showing an example of a method of processing information based on a resource index.

FIG. 15 is a flow chart showing an example of a method of processing information based on a resource index.

Referring to FIG. 15, a UE determines a CS index based on a resource index (S41). The UE generates a cyclically shifted sequence based on the CS index (S42). The cyclically shifted sequence can be generated by cyclically shifting a basis sequence by a CS amount obtained from the CS index. The UE generates a modulated sequence based on the cyclically shifted sequence and a symbol for information (S43). The UE maps the modulated sequence to an RB (S44). The RB can be determined based on the resource index. The UE transmits the modulated sequence. In this case, the information transmitted by the UE may be a CQI.

Figure 16:
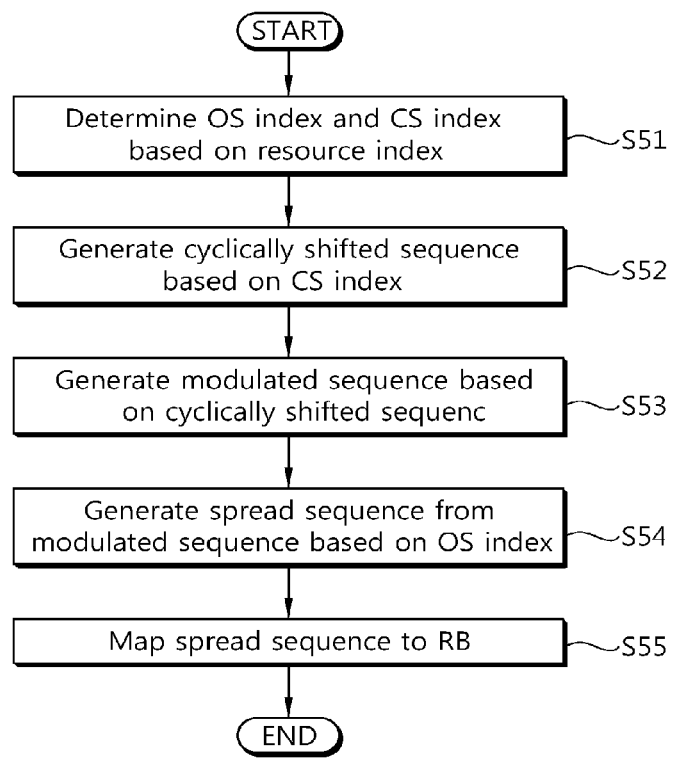
FIG. 16 is a flow chart showing another example of the method of processing information based on a resource index.

FIG. 16 is a flow chart showing another example of the method of processing information based on a resource index.

Referring to FIG. 16, a UE determines an OS index and a CS index based on a resource index (S51). The UE generates a cyclically shifted sequence based on the CS index (S52). The UE generates a modulated sequence based on the cyclically shifted sequence and a symbol for information (S53). The UE generates a spread sequence from the modulated sequence based on the OS index (S54). The UE maps the spread sequence to a RB (S55). The RB can be determined based on the resource index. The UE transmits the spread sequence. In this case, the information transmitted by the UE may be an SR, an HARQ ACK/NACK, etc.

As described so far, the UL information of each of a plurality of UEs in a cell can be multiplexed in a subframe according to the code division multiplexing (CDM) and/or frequency division multiplexing (FDM) scheme, and transmitted. The each of the plurality of UEs may simultaneously transmit information to the BS by using a mutually different resource. The BS can discriminate the information of each UE which has been transmitted concurrently from each UE.

The UEs may transmit the information through a plurality of transmit antennas. A transmit diversity scheme, among MIMO techniques, has a diversity gain and can increase the reliability of wireless communication. The transmit diversity scheme includes, for example, cyclic delay diversity (CDD), precoding vector switching (PVS), single carrier space-frequency block coding (SC-SFBC), space-time block coding (STBC), and the like. However, if these schemes are in use, a problem arises in that the orthogonality is not maintained, the transmit diversity gain is limited, or backward compatibility with the 3GPP LTE is not satisfied. Thus, a method of transmitting information using a transmit diversity scheme that can solve the problems needs to be provided.

Figure 17:
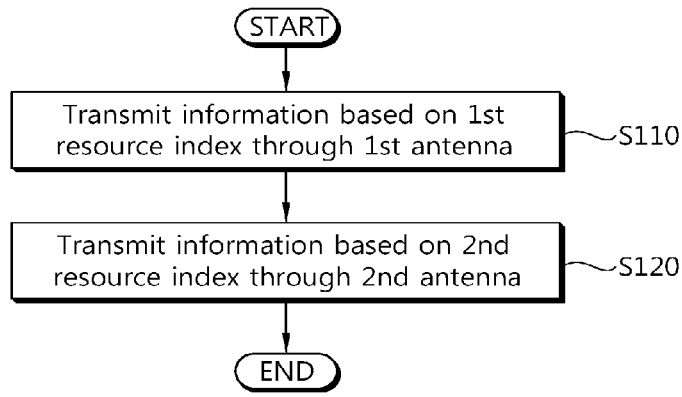
FIG. 17 is a flow chart showing a method of transmitting information according to an embodiment of the present invention.

FIG. 17 is a flow chart showing a method of transmitting information according to an embodiment of the present invention.

Referring to FIG. 17, a transmitter transmits information based on a first resource index through a first antenna (S110). The transmitter transmits the information based on a second resource index through a second antenna (S120). The same information is simultaneously transmitted through the first antenna and the second antenna. The first resource index and the second resource index may be different from each other. If the first resource index and the second resource index are different, an orthogonality between the different transmit antennas as well as the different UEs can be maintained. A diversity gain can be obtained by repeatedly transmitting the same information through a plurality of antennas. The information transmission method in which a spatial multiplexing rate is ½ is called an orthogonal space resource transmission (OSRT).

For channel estimation of the first antenna and the second antenna, two resources must be allocated to the RS part. Thus, even if resources that can be allocated to the information part are left, the UE multiplexing capacity is limited by the RS part, rather than the information part. Thus, the information transmission method having the space multiplexing transmission rate of ½ is not a burden for a system.

If the transmitter is a part of a UE, examples of a method of acquiring the first resource index and the second resource index will now be described.

The UE may receive each of the first resource index and the second resource index from a BS. For example, each of the plurality of resource indices may be directly signaled; the first resource index is signaled as 0 and the second resource index is signaled as 2. Otherwise, the UE may receive the first resource index from the BS and acquire the second resource index from the first resource index. In this case, the second resource index may be predetermined according to the first resource index. For example, if the first resource index is 0, the second resource index may be predetermined as 5, and if the first resource index is 1, the second resource index may be predetermined as 6. If the BS signals only 0 or 1 as the first resource index, the UE may acquire the second resource index 5 or 6 from the first resource index.

Examples of a method of acquiring the first resource index and the second resource index by the UE in case of transmitting dynamic ACK/NACK will now be described.

The UE may implicitly acquire the first resource index from a first CCE index used for PDCCH transmission with respect to the PDSCH as in the 3GPP LTE (Release 8). The second resource index may be explicitly informed by the BS. In order to explicitly inform about the second resource index, signaling of a physical layer or signaling of a higher layer (e.g., the RRC) of the physical layer may be used. For the physical layer signaling, the PDCCH may include an information field indicating the second resource index.

First, the UE may implicitly recognize the first resource index from the first CCE index used for the PDCCH transmission. The UE may recognize the second resource index by RRC signaling.

Second, the UE may recognize the first resource index from the CCE index used for the PDCCH transmission. The UE may recognize the second resource index by an information field included in the PDCCH.

Three or more resource indices can be acquired in a similar manner. The first resource index may be acquired from a first CCE index used for PDCCH transmission, and other resource indices such as second and third resource indices may be acquired by the RRC signaling or the information field included in the PDCCH. In this case, a plurality of information fields included in the PDCCH may indicate the resource indices.

In this manner, a signaling overhead can be reduced by preventing signaling of the entire resource indices. In addition, coexistence with a legacy UE to which 3GPP LTE is applied can be possible.

Next, the resource index will be described

First, each resource index may indicate a CS index and an RB. The CS index may be subject to CS hopping at a symbol level, starting from an allocated OFDM symbol. In this case, the first resource index may indicate a first CS index and a first RB, and the second resource index may indicate a second CS index and a second RB. The information may be processed like the PUCCH format 2/2a/2b based on the each resource index. The transmitter may generate a first cyclically shifted sequence by cyclically shifting a base sequence by a first CS amount obtained from the first CS index, generate a first modulated sequence based on the first cyclically shifted sequence and a symbol for the information, and transmit the first modulated sequence through the first antenna after mapping the first modulated sequence to the first RB. Also, the transmitter may generate a second cyclically shifted sequence by cyclically shifting the base sequence by a second CS amount obtained from the second CS index, generate a second modulated sequence based on the second cyclically shifted sequence and the symbol for the information, and transmit the second modulated sequence through the second antenna after mapping the second modulated sequence to the second RB. The first modulated sequence and the second modulated sequence may be simultaneously transmitted.

At least one of the CS index and the RB of the first and second resource indices may be different. Otherwise, the scheduler of the BS may limit the resource index in the following cases: (1) in case where the first and second CS indices are different and the first and second RBs are the same, (2) in case where the first and second CS indices are the same and the first and second RBs are different, and (3) in the event of one of the cases (1) and (2).

(1) If resource index is limited only to the case where the first and second CS indices are different and the first and second RBs are the same, information may be considered to be transmitted according to a large delay CCD scheme in transmit configuration point of view without resource allocation principle. (2) If the first and second CS indices are the same while the first and second RBs are different, the same information is transmitted orthogonally for each transmit antenna on the first and second RBs.

Second, each resource index may indicate a CS index, an OS index, and an RB. In this case, the first resource index may indicate a first CS index, a first OS index, and a first RB, and the second resource index may indicate a second CS index, a second OS index, and a second RB. The information may be processed like the PUCCH format 1/1a/1b based on the each resource index. The transmitter may generate a first cyclically shifted sequence by cyclically shifting a base sequence by a first CS amount obtained from the first CS index, generate a first modulated sequence based on the first cyclically shifted sequence and a symbol for the information, generate a first spread sequence from the first modulated sequence based on the first OS index, and transmit the first spread sequence through the first antenna after mapping the first spread sequence to the first RB. Also, the transmitter may generate a second cyclically shifted sequence by cyclically shifting the base sequence by a second CS amount obtained from the second CS index, generate a second modulated sequence based on the second cyclically shifted sequence and the symbol for the information, generate a second spread sequence from the second modulated sequence based on the second OS index, and transmit the second spread sequence through the second antenna after mapping the second spread sequence to the second RB. The first spread sequence and the second spread sequence may be simultaneously transmitted.

The transmitter may receive data, and the information may be an HARQ ACK/NACK for the data. The first resource index may be acquired from a radio resource for a physical control channel to receive the data, and the second resource index may be acquired from the first resource index.

At least one of the CS index, the OS index, and the RB of the first and second resource indices may be different. Otherwise, the schedule of the BS may limit the resource index in the following cases: (1) in case where the first and second OS indices are the same, the first and second RBs are the same, and only the first and second CS indices are different, (2) in case where the first and second CS indices are the same, the first and second RBs are the same, and only the first and second OS indices are different, (3) in case where the first and second CS indices are the same, the first and second OS indices are the same, and only the first and second RBs are different, (4) in the event of one of the cases (1) and (2), (5) in the event of one of the cases (1) and (3), (6) in the event of one of the cases (2) and (3), (7) in the event of one of the cases (1), (2), and (3).

(1) If only the first and second CS indices are different, the information may be considered to be transmitted according to the larger delay CDD in transmit configuration point of view without resource allocation principle. (2) If only the first and second OS indices are different, the information may be considered to be transmitted according to the symbol level PVS in which each OFDM symbol has a different precoding vector. (3) If only the first and second RBs are different, the same information is transmitted on the first and second RBs such that it is orthogonal to each transmit antenna.

So far, the OSRT in which the information is processed like the PUCCH format 1/1a/1 b or the PUCCH format 2/2a/2b has been described, but the OSRT can be applicable to every CDM-based transmission scheme. In addition, the OSRT regarding the two transmit antennas has been described, but the OSRT can transmit information with respect to two or more transmit antennas by using different resource indices for each transmit antenna.

If it is assumed that 18 UEs can be multiplexed per RB in case of a single antenna transmission, nine UEs can be multiplexed per RB in case of the OSRT with respect two transmit antennas. In case of the PUCCH format 1/1a/1b, the same information is transmitted in first and second slots. The RBs allocated to the PUCCH are hopped at the slot level. Namely, the information is transmitted through mutually different subcarriers over time, a frequency diversity gain can be obtained. In this respect, providing that the sufficiency diversity gain is obtained by the OSRT, the same information transmitted in the first slot does not need to be transmitted also in the second slot. Thus, the first and second slots may transmit mutually different information. In this case, the UE multiplexing capacity of the OSRT with respect to the two transmit antennas can be maintained to be equal to the UE multiplexing capacity of a single antenna transmission. For example, if 18 UEs per RB are multiplexed in case of the single antenna transmission, 18 UEs per RB can be multiplexed also in the OSRT with respect to the two transmit antennas.

A transmission mode adaptation of the UE is available according to a channel state or a traffic load situation. The transmission mode may be configured semi-statically. The transmission mode can be configured by the higher layer such as the RRC layer. The transmission mode can be divided into a single antenna transmission and multi-antenna transmission. For example, a first UE in a poor channel environment may perform multi-antenna transmission, and a second UE in a relatively good channel environment may perform the single antenna transmission. Otherwise, if the number of UEs multiplexed for the same time resource is large, the single antenna transmission may be performed, while if the number of multiplexed UEs is relatively small, the multi-antenna transmission may be performed. Accordingly, the OSRT can be also adaptively applied according to the transmission mode of the UE.

The information transmission method of FIG. 17 can be also extendedly applied for three or more transmit antennas. If the UE intends to transmit information through R number of transmit antennas, it can be allocated R number of mutually different resource indices with respect to each of the R number of transmit antennas (where R is natural number or 2 or larger). The UE may transmit the information to the BS through each transmit antenna by using each resource index.

Figure 18:
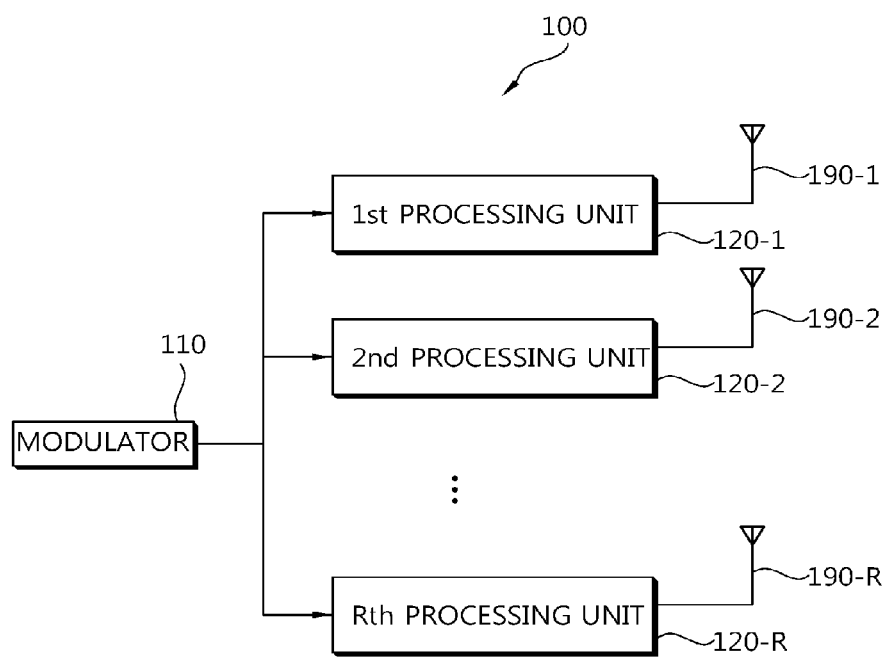
FIG. 18 is a block diagram showing an example of a transmitter structure.

FIG. 18 is a block diagram showing an example of a transmitter structure. Here, the transmitter may be a part of the UE or the BS.

Referring to FIG. 18, the transmitter 100 includes a modulator 110, R number of processing units 120-1, . . . , 120-R (where R is natural number of 2 or larger), and R number of transmit antennas 190-1, . . . , 190-R. The rth processing unit 120-$r$ is coupled with the rth transmit antenna 190-$r$ (r=1, . . . R). A resource index is allocated to each of the R number of transmit antennas 190-1, . . . , 190-R. Namely, the rth resource index is allocated to the rth transmit antenna 190-$r$. The modulator 110 modulates information to generate a modulation symbol. There is not limitation in the modulation scheme. That is, the modulation scheme may be m-phase shift keying (m-PSK) or m-quadrature amplitude modulation (m-QAM). The modulation symbol may be one or more. The modulation symbol is copied and inputted to each of the R number of processing units 120-1, . . . , 120-R. The R number of processing units 120-1, . . . , 120-R respectively process the information based on corresponding resource index. Namely, the rth processing unit 120-r processes the information based on the rth resource index. In this case, each of the R number of processing units 120-1, . . . , 120-R may transform the modulation symbol d to process. If the modulation symbol is d, the first processing unit 120-1 may process d, and the second processing unit 120-2 may process d*. Here, (·)* is a complex conjugate. Otherwise, the transformed modulation symbol dr may be represented by the following equation.

MathFigure 6

$$d_r = d \cdot \exp(j\theta_r) \text{ or } a_r \cdot d \quad \text{[Math. 6]}$$

Here, $a_r$ is a complex scaling factor of the rth processing unit 120-r.

The information processed by the rth processing unit 120-r by using the rth resource index is transmitted through the rth transmit antenna.

If three or more transmit antennas are used, the OSRT may be used by combined with a different transmission diversity scheme such as CDD or PVS. For example, if four transmit antennas are used, the four transmit antennas may be divided by twos into two antenna groups. The OSRT may be applied to the two antenna groups, while the CDD or PVS may be applied to each group.

Hereinafter, description will be focused on the case of using two transmit antennas for the sake of brevity.

A signal generated by processing the information by using the first resource index is a first signal ($s_1$), and a signal generated by processing the information by using the second resource index is a second signal ($s_2$).

The transmission signal matrix can be represented by the following equation.

MathFigure 7

$$\begin{bmatrix} s_1 & 0 \\ 0 & s_2 \end{bmatrix} \quad \text{[Math. 7]}$$

Here, a row and/or a column of the transmission signal matrix may correspond to a transmit antenna, a resource index, and the like. For example, each row of the transmission signal matrix may correspond to each resource index, and each column may correspond to each transmit antenna.

$y_1$ is a first reception signal with respect to the information which has been transmitted by using the first resource index, and $y_2$ is a second reception signal with respect to the information which has been transmitted by using the second resource index. An actual reception signal (y) is obtained by adding the first reception signal ($y_1$) and the second reception signal ($y_2$) ($y=y_1+y_2$). In this case, it is assumed that the reception signal (y) can be separated into the first reception signal ($y_1$) and the second reception signal ($y_2$) through a despreading operation. Also, it is assumed that the receiver has one reception antenna, for the sake of brevity.

The reception signal matrix can be represented by the following equation.

MathFigure 8

$$\begin{bmatrix} y_1 \\ y_2 \end{bmatrix} = \begin{bmatrix} s_1 & 0 \\ 0 & s_2 \end{bmatrix} \begin{bmatrix} h_1 \\ h_2 \end{bmatrix} + \begin{bmatrix} n_1 \\ n_2 \end{bmatrix} \quad \text{[Math. 8]}$$

Here, $h_1$ is a channel with respect to a first transmit antenna, $h_2$ is a channel with respect to a second transmit antenna, $n_1$ is noise of the first reception signal, and $n_2$ is noise of the second reception signal. Here, the noise may be an additive white Gaussian noise (AWGN).

In general, if transmit power is limited, a normalization factor corresponding to the number of transmit antennas may be applied. The following equation shows an example of the normalization factor.

MathFigure 9

$$\frac{1}{\sqrt{Ntx \times Nc}} \quad \text{[Math. 9]}$$

Here, Ntx is the number of transmit antennas, and Nc is the number of resources per antenna. In the following description, the normalization factor will be omitted for the sake of brevity.

If despreading is performed on each resource index from the reception signal, a diversity gain as represented by the following equation can be obtained.

MathFigure 10

$$|h_1|^2 + |h_2|^2 \quad \text{[Math. 10]}$$

The obtained diversity gain is a diversity gain such as maximal ratio combining (MRC) which is an optimal combining. The MRC scheme is one of signal combining scheme for estimating a transmission signal from a reception signal received through a plurality of receive antennas.

First, the case of using a single modulation symbol for transmission of the information, like the PUCCH format 1/1a/1b, will now be described in first to third exemplary embodiments.

In the first and second exemplary embodiments, a resource used for transmission of the information includes only OS. In this case, a resource index indicates only OS index.

The rth OS having a spread coefficient K=N indicated by the rth resource index is [$w_r(0), w_r(1), \ldots, w_r(N-1)$] (where N is natural number, r=1, . . . , R). the rth spread sequence generated by spreading the modulation symbol d(0) through the rth OS is [$z_r(0), z_r(1), \ldots, z_r(N-1)$]. The spread sequence can be generated as represented by the following equation.

MathFigure 11

$$z_r(k) = d(0) \cdot w_r(k), \ k=0,1,2, \ldots, N-1 \quad \text{[Math. 11]}$$

The rth spread sequence may be mapped to a time domain or a frequency domain. If the rth spread sequence is mapped to the frequency domain, the rth spread sequence may be mapped to N number of subcarriers. If the rth spread sequence is mapped to the time domain, the rth spread sequence may be mapped to N number of time samples, N number of chips, or N number of OFDM symbols.

The R number of spread sequences generated by using each of the R number of resource indices are transmitted through R number of transmit antennas, respectively. Namely, the rth spread sequence generated by using the rth resource index is transmitted through the rth transmit antenna (r=1, 2, . . . , R). In this case, the R number of spread sequences may be concurrently transmitted during a single transmission interval. For example, the single transmission interval may be a subframe.

The reception signal is y=[y(0), y(1), . . . , y(N−1)]. The reception signal may be represented by the following equation. In this case, it is assumed that the characteristic of a channel with respect to each transmit antenna is static during the transmission interval. That is, the characteristic of the channel with respect to the each transmit antenna may not change during the transmission interval.

MathFigure 12

$$y(k) = \sum_{r=1}^{R} z_r(k) \cdot h_r + n(k), k = 0, 1, \ldots, N-1 \quad [\text{Math. 12}]$$

Here, $h_r$ is a channel with respect to the rth transmit antenna during the transmission interval, and n(k) is the kth element of noise.

Despreading may be performed on each of the R number of resource indices from the reception signal to generate R number of estimated symbols. If the rth estimated symbol obtained by despreading the rth resource index is $d'_r(0)$, it can be represented by the following equation.

MathFigure 13

$$d'_r(0) = \sum_{k=0}^{N-1} y(k) \cdot (w_r(k))^* \quad [\text{Math. 13}]$$

Here, N is the length of the OS, $w_r(k)$ is the kth element of the rth OS.

An estimated symbol d'(0) with respect to the modulation symbol d(0) can be obtained by combining the R number of estimated symbols.

1. First Exemplary Embodiment

In the first exemplary embodiment, a Walsh-Hadamard matrix is used as the OS.

The following equation represents a 4×4 Walsh-Hadamard matrix:

MathFigure 14

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad [\text{Math. 14}]$$

Each of the four rows of the Walsh-Hadamard matrix constitutes OSs in which they are mutually orthogonal. Namely, four OSs such as [1, 1, 1, 1], [1, -1, 1, -1], [1, 1, -1, -1], and [1, -1, -1, 1] may be defined. In the 3GPP LTE, the three OSs excluding [1, -1, -1, 1] are used (See Table 3), but [1, -1, -1, 1] can be also used as the OS.

The case where R=2, a first OS is [1, -1, 1, -1], and a second OS is [1, 1, -1, -1] will now be taken as an example.

The first spread sequence becomes [d(0), -d(0), d(0), -d(0)], the second spread sequence becomes [d(0), d(0), -d(0), -d(0)]. If reception signal is y=[y(0), y(1), y(2), y(3)], the reception signal may be represented by the following equation.

MathFigure 15

$$y(0)=d(0)h_1+d(0)h_2+n(0)$$

$$y(1)=-d(0)h_1+d(0)h_2+n(1)$$

$$y(2)=d(0)h_1-d(0)h_2+n(2)$$

$$y(3)=-d(0)h_1-d(0)h_2+n(3) \quad [\text{Math. 15}]$$

If a first estimated symbol obtained by despreading the first OS [1, -1, 1, -1] from the reception signal is $d'_1(0)$ and a second estimated symbol obtained by despreading the second OS [1, 1, -1, -1] from the reception signal is $d'_2(0)$, the first and second estimated symbols may be represented by the following equation.

MathFigure 16

$$d'_1(0)=4d(0)h_1+n'_1$$

$$d'_2(0)=4d(0)h_2+n'_2 \quad [\text{Math. 16}]$$

An estimated symbol d'(0) obtained by combining the first and second estimated symbols may be represented by the following equation.

MathFigure 17

$$\begin{aligned} d'(0) &= d'_1(0)h_1^* + d'_2(0)h_2^* \\ &= (4d(0)h_1 + n'_1)h_1^* + (4d(0)h_2 + n'_2)h_2^* \\ &= 4(|h_1|^2 + |h_2|^2)d(0) + n' \end{aligned} \quad [\text{Math. 17}]$$

In this manner, a diversity gain is obtained.

2. Second Exemplary Embodiment

In the second exemplary embodiment, a discrete Fourier transform (DFT) code is used as an OS. The use of the DFT code is equivalent to a cyclic shift of another domain. Namely, the use of the DFT code in the time domain is equivalent to the cyclic shift in the frequency domain. Otherwise, the use of the DFT code in the frequency domain is equivalent to the cyclic shift in the time domain.

The following equation represents a 4×4 DFT code matrix.

MathFigure 18

$$\begin{bmatrix} 1 & e^{j2\pi \cdot 1 \cdot 0/4} & e^{j2\pi \cdot 2 \cdot 0/4} & e^{j2\pi \cdot 3 \cdot 0/4} \\ 1 & e^{j2\pi \cdot 1 \cdot 1/4} & e^{j2\pi \cdot 2 \cdot 1/4} & e^{j2\pi \cdot 3 \cdot 1/4} \\ 1 & e^{j2\pi \cdot 1 \cdot 2/4} & e^{j2\pi \cdot 2 \cdot 2/4} & e^{j2\pi \cdot 3 \cdot 2/4} \\ 1 & e^{j2\pi \cdot 1 \cdot 3/4} & e^{j2\pi \cdot 2 \cdot 3/4} & e^{j2\pi \cdot 3 \cdot 3/4} \end{bmatrix} \quad [\text{Math. 18}]$$

Each of the four rows of the DFT code matrix constitutes OSs in which they are mutually orthogonal. Namely, four OSs having a length of 4 may be defined from the DFT code matrix.

The case where R=2, a first OS is $w_1$, and a second OS is $w_2$ as represented by the following equation will be taken as an example.

MathFigure 19

$$w_1=[1, e^{j2\pi \cdot 1 \cdot 1/4}, e^{j2\pi \cdot 2 \cdot 1/4}, e^{j2\pi \cdot 3 \cdot 1/4}]$$

$$w_2=[1, e^{j2\pi \cdot 1 \cdot 2/4}, e^{j2\pi \cdot 2 \cdot 2/4}, e^{j2\pi \cdot 3 \cdot 2/4}] \quad [\text{Math. 19}]$$

A first spread sequence $z_1$ and a second spread sequence $z_2$ may be represented by the following equation.

MathFigure 20

$$z_1 = [d(0), d(0)e^{j2\pi \cdot 1 \cdot 1/4}, d(0)e^{j2\pi \cdot 2 \cdot 1/4}, d(0)e^{j2\pi \cdot 3 \cdot 1/4}]$$

$$z_2 = [d(0), d(0)e^{j2\pi \cdot 1 \cdot 2/4}, d(0)e^{j2\pi \cdot 2 \cdot 2/4}, d(0)e^{j2\pi \cdot 3 \cdot 2/4}] \quad \text{[Math. 20]}$$

If a first estimated symbol obtained by despreading the first OS $w_1$ from the reception signal is $d'_1(0)$ and a second estimated symbol obtained by despreading the second OS $w_2$ from the reception signal is $d'_2(0)$, the first and second estimated symbols may be represented by the following equation.

MathFigure 21

$$d'_1(0) = 4d(0)h_1 + n'_1$$

$$d'_2(0) = 4d(0)h_2 + n'_2 \quad \text{[Math. 21]}$$

An estimated symbol $d'(0)$ obtained by combining the first and second estimated symbols may be represented by the following equation.

MathFigure 22

$$\begin{aligned} d'(0) &= d'_1(0)h_1^* + d'_2(0)h_2^* \\ &= (4d(0)h_1 + n'_1)h_1^* + (4d(0)h_2 + n'_2)h_2^* \\ &= 4(|h_1|^2 + |h_2|^2)d(0) + n' \end{aligned} \quad \text{[Math. 22]}$$

In this manner, a diversity gain is obtained.

3. Third Exemplary Embodiment

In the third exemplary embodiment, a resource used for information transmission includes an OS and the amount of CS. In this case, a resource index indicates an OS index and a CS index.

The rth spread sequence generated by using the rth resource index may be represented as two-dimensional time-frequency domain as represented by the following equation.

MathFigure 23

$$\begin{bmatrix} z_r(0,0) & z_r(0,1) & z_r(0,2) & z_r(0,3) \\ z_r(1,0) & z_r(1,1) & z_r(1,2) & z_r(1,3) \\ \vdots & \vdots & \vdots & \vdots \\ z_r(11,0) & z_r(11,1) & z_r(11,2) & z_r(11,3) \end{bmatrix} \quad \text{[Math. 23]}$$

Here, each row may correspond to a subcarrier, and each column may correspond to an OFDM symbol. Each element of the matrix may be mapped to resource elements of RBs used for information transmission. Here, the matrix includes 12 rows and four columns, but it is merely illustrative and the number of rows and columns is not limited.

Figure 19:
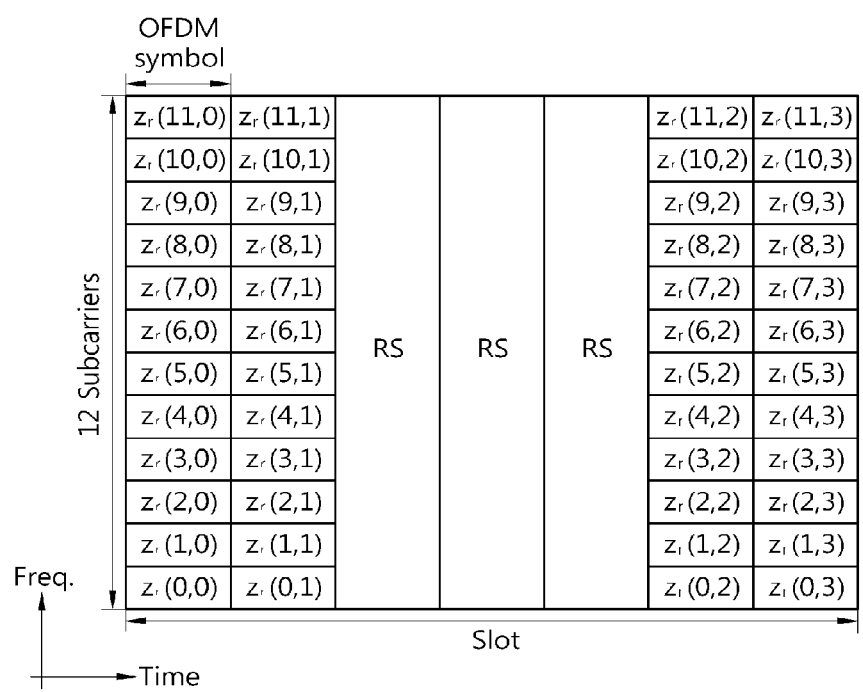
FIG. 19 shows an example of a single RB to which the rth spread sequence is mapped.

FIG. 19 shows an example of a single RB to which the rth spread sequence is mapped.

Referring to FIG. 19, the RB includes a slot (7 OFDM symbols) in the time domain and 12 subcarriers in the frequency domain. RS is carried on three of the seven symbols, and information is carried on the remaining 4 OFDM symbols (See FIG. 8).

The UE determines the rth OS index and the rth CS index by using the rth resource index. The UE generates the rth cyclically shifted sequence based on the rth CS index. The UE generates the rth modulated sequence based on the rth cyclically shifted sequence and the modulation symbol $d(0)$ with respect to the information. The UE generates the rth spread sequence from the rth modulated sequence based on the rth OS index. Elements of the rth spread sequence may be represented by the following equation.

MathFigure 24

$$z_r(n,k) = w_r(k) \cdot d(0) \cdot r(n, Ics^r) \quad \text{[Math. 24]}$$

Here, $n = 0, \ldots, 11$, $k = 0, 1, 2$, and $3$, $w_r(k)$ is the kth element of the rth OS indicated by the rth resource index, $Ics^r$ is the rth CS index, and $r(n, Ics^r)$ is the rth cyclically shifted sequence.

The case of $R=2$ will be described for the sake of brevity. If $R=2$, the following three case can be considered in the third exemplary embodiment: (1) the case where the first and second CS indices are different and the first and second OS indices are the same, (2) the case where the first and second CS indices are different and the first and second OS indices are different, and (3) the case where the first and second CS indices are the same and the first and second OS indices are different. Each case will now be described.

(1) If the first and second CS indices are different and the first and second OS indices are the same For example, it is assumed that the first resource index indicates 0 as the first CS index and [1, 1, 1, 1] as the first OS. Also, it is assumed that the second resource index indicates 2 as the second CS index and [1, 1, 1, 1] as the second OS.

A first spread sequence $z_1(n,k)$ generated by using the first resource index transmitted through the first transmit antenna and a second spread sequence $z_2(n,k)$ generated by using the second resource index transmitted through the second transmit antenna may be represented by the following equation.

MathFigure 25

$$z_1(n,k) = w_1(k) \cdot d(0) \cdot r(n) \cdot \exp\left(\frac{j2\pi \cdot 0 \cdot n}{12}\right) \quad \text{[Math. 25]}$$

$$z_2(n,k) = w_2(k) \cdot d(0) \cdot r(n) \cdot \exp\left(\frac{j2\pi \cdot 2 \cdot n}{12}\right)$$

Here, $r(n)$ is a base sequence.

A reception signal $y(n,k)$ may be represented by the following equation ($0 \leq n \leq 11$, $0 \leq k \leq 3$, and n and k are integer).

MathFigure 26

$$y(n,k) = z_1(n,k)h_1 + z_2(n,k)h_2 + n(n,k) \quad \text{[Math. 26]}$$

If a first estimated symbol obtained by despreading the first resource index from the reception signal is $d'_1(0)$ and a second estimated symbol obtained by despreading the second resource index from the reception signal is $d'_2(0)$, the first and second estimated symbols may be represented by the following equation.

MathFigure 27

$$d'_1(0) = 48d(0)h_1 + n'_1$$

$$d'_2(0) = 48d(0)h_2 + n'_2 \quad \text{[Math. 27]}$$

Here, if a cyclic shift is despread, a simple frequency coherent detector or an IFFT-based maximum likelihood (ML) detector may be used.

An estimated symbol d'(0) obtained by combining the first and second estimated symbols may be represented by the following equation.

MathFigure 28

$$d'(0) = d'_1(0)h_1^* + d'_2(0)h_2^*$$
$$= (48d(0)h_1 + n'_1)h_1^* + (48d(0)h_2 + n'_2)h_2^*$$
$$= 48(|h_1|^2 + |h_2|^2)d(0) + n'$$  [Math. 28]

In this manner, a diversity gain is obtained.

(2) If the first and second CS indices are different and the first and second OS indices are different For example, it is assumed that the first resource index indicates 0 as the first CS index and [1, 1, 1, 1] as the first OS. Also, it is assumed that the second resource index indicates 2 as the second CS index and [1, −1, 1, −1] as the second OS.

Also, in this case, the same diversity gain as that of the case (1) where the first and second CS indices are different and the first and second OS indices are the same is obtained.

(3) If the first and second CS indices are the same and the first and second OS indices are different For example, it is assumed that the first resource index indicates 0 as the first CS index and [1, 1, 1, 1] as the first OS. Also, it is assumed that the second resource index indicates 0 as the second CS index and [1, −1, 1, −1] as the second OS.

Also, in this case, the same diversity gain as that of the case (1) where the first and second CS indices are different and the first and second OS indices are the same is obtained.

4. Fourth Exemplary Embodiment

In the fourth exemplary embodiment, a resource used for information transmission includes an OS, the amount of CS, and an RB. In this case, a resource index indicates an OS index, a CS index, and an RB.

The rth spread sequence may be represented by the following equation.

MathFigure 29

$$z_r(n+R_r,k) = w_r(k) \cdot d(0) \cdot r(n, Ics^r)$$  [Math. 29]

Here, k is a symbol index of an OFDM symbol within the rth RB. Excluding an OFDM symbol in which RS is carried, k may be 0, 1, 2, and 3. $R_r$ is a frequency position offset of the rth RB, and n is a subcarrier index within the rth RB (n=0, 1, . . . , 11). $w_r(k)$ is the kth element of the rth OS index, $Ics^r$ is the rth CS index, and $r(n,Ics^r)$ is the rth cyclically shifted sequence.

The case of using a plurality of modulation symbols for information transmission, like the PUCCH format 2/2a/2b, will now be described. A resource used for transmission of information includes a cyclic shift sequence and an RB. In this case, a resource index indicates a CS index and an RB. Each resource index corresponds to each transmit antenna. For example, the rth resource index corresponds to the rth transmit antenna.

The UE determines the rth CS index and the rth RB by using the rth resource index. The UE generates the rth cyclically shifted sequence by using the rth CS index. The UE generates the rth modulated sequence by using the rth cyclically shifted sequence and a plurality of modulation symbols with respect to the information. The UE maps the rth modulated sequence to the rth RB. The UE transmits the rth modulated sequence through the rth transmit antenna.

Elements of the rth modulated sequence may be represented by the following equation.

MathFigure 30

$$s_r(n+R_r, k) = d(k) \cdot r(n) \cdot \exp\left(\frac{j2\pi n Ics^r}{12}\right)$$  [Math. 30]

Here, k may be a symbol index of an OFDM symbol within the rth RB. Excluding an OFDM symbol in which RS is carried, k may be 0, 1, . . . , 9. $R_r$ is a frequency position offset of the rth RB, and n is a subcarrier index within the rth RB (n=0, 1, . . . , 11). $Ics^r$ is the rth CS index, and $r(n,Ics^r)$ is the rth cyclically shifted sequence.

Figure 20:
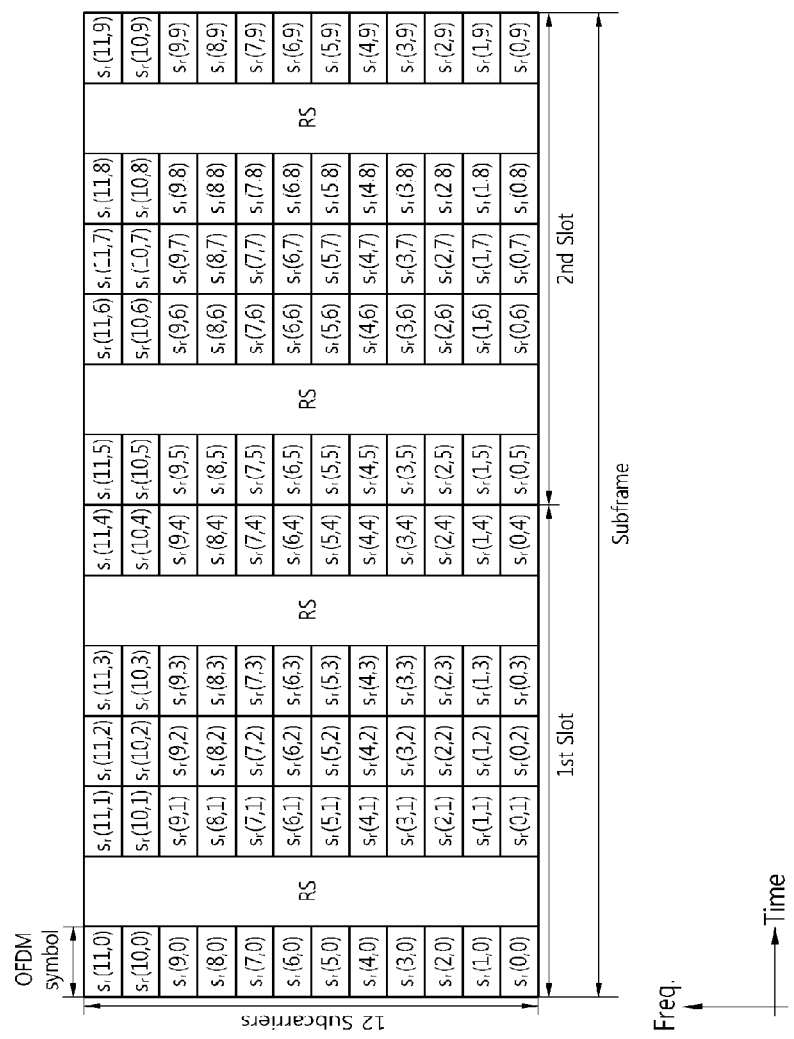
FIG. 20 shows an example of a subframe to which the rth modulated sequence is mapped.

FIG. 20 shows an example of a subframe to which the rth modulated sequence is mapped. Here, it is shown that RBs belonging to the RB pair occupy the same frequency band in the first and second slots, but as described above with reference to FIG. 7, the RBs may be hopped at a slot level.

With reference to FIG. 20, RS is carried on two of the seven symbols included in each slot, and information is carried on the remaining 5 OFDM symbols (See FIG. 10).

Figure 21:
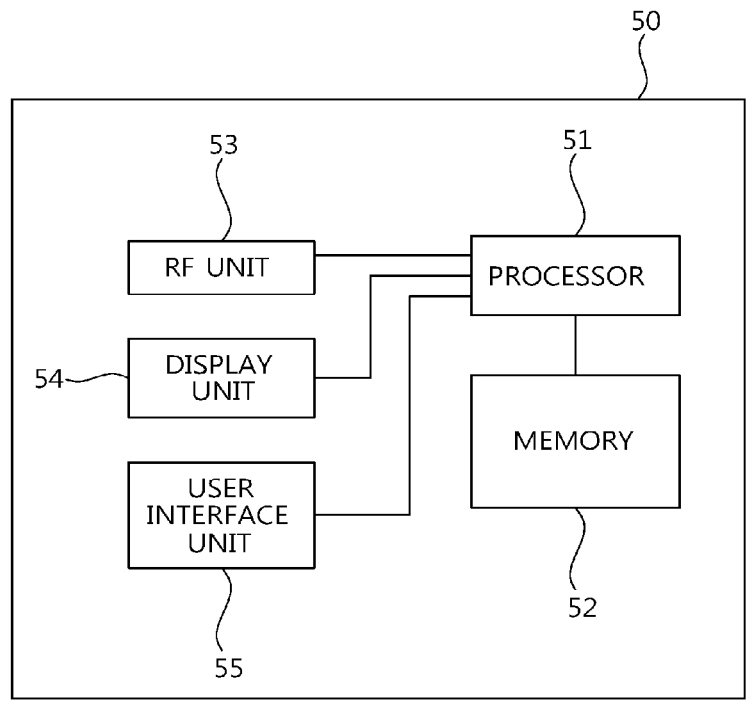
FIG. 21 is a block diagram of an apparatus for a wireless communication.

FIG. 21 is a block diagram of an apparatus for a wireless communication. An apparatus 50 for a wireless communication may be a part of an UE. The apparatus 50 includes a processor 51, a memory 52, an RF (radio frequency) unit 53, a display unit 54, and a user interface unit 55. The RF unit 53 is coupled with the processor 51, and configured to transmit and/or receive a radio signal. The memory 52 is coupled with the processor 51 and configured to store a driving system, applications and general files. The display unit 54 displays information on the UE and may use a well-known element such as liquid crystal display (LCD), organic light emitting diodes (OLED), etc. The user interface 55 may be implemented by a combination of user interfaces such as keypad, touch screen, etc. The processor 51 performs all the aforementioned operations including the operation of processing and transmitting information.

Figure 22:
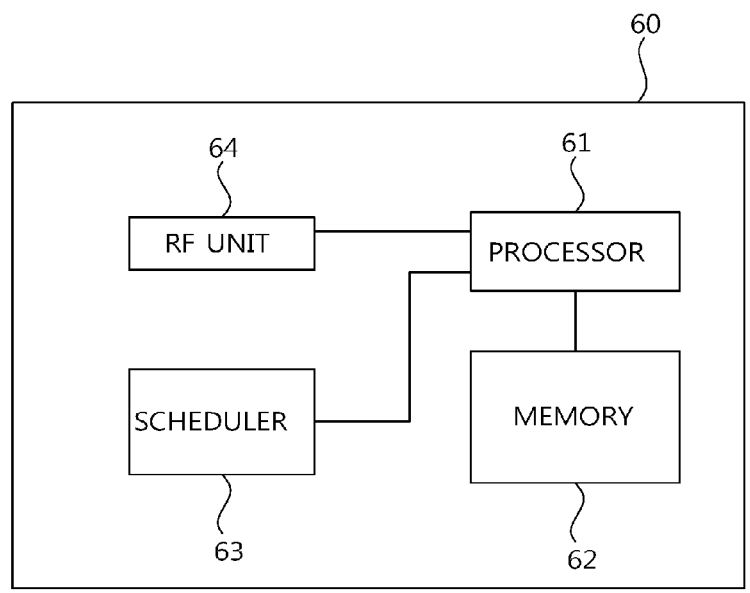
FIG. 22 is a block diagram of a BS.

FIG. 22 is a block diagram of a BS. A BS 60 includes a processor 61, a memory 62, a scheduler 63, and an RF unit 64. The RF unit 64 is coupled with the processor 61 and configured to transmit and/or receive a radio signal. The processor 61 can carry out all the above-described methods associated with transmitting information. The memory 62 is coupled with the processor 61 and configured to store information processed by the processor 61. The scheduler 63 is coupled with the processor 61 and can perform all the aforementioned methods associated with scheduling for transmission of information such as allocation of resource index.

The simulation results with respect to a reception performance of the information transmission method using the OSRT as described above will now be explained. The simulation results were obtained by comparing a bit error rate (BER) over a signal-to-noise ratio (SNR) in case of the single antenna transmission (1Tx), PVS, CDD, SC-SFBC, STBC, and OSRT transmission scheme.

The following table shows parameters and assumptions for a link level simulation.

TABLE 11

| Parameters | Assumptions |
|---|---|
| Carrier frequency | 2 GHz |
| System BW | 5 MHz |
| Sampling frequency | 15.36 MHz |
| CP configuration | Normal CP |
| UE speed | 3 km/h |
| Channel model | ETU9 |
| Number of cells | 1 |
| Number of Tx antennas | 1, 2 (uncorrelated, $|\rho| = 0.5$) |
| Number of Rx antennas | 2 (uncorrelated, $|\rho| = 0.9$) |
| ACK/NACK bits | 2 bit (QPSK) - format 1b |
| CQI information bits (A) | 11 bits (QPSK) - formal 2a |
| Channel estimation | Practical |
| CS hopping/OS remapping/ frequency hopping | ON |
| ACK/NACK scrambling | ON |
| Number of RBs for PUCCH | 1 |
| CS interval | 2 |
| Number of UEs within a cell | 9 for A/N, 3 for CQI (all UEs transmit the signal with same power) |
| Unpaired symbol handling for format 2 (only for STBC) | Simple repetition |
| SFBC, STBC in format 1b | Applied after CDM/FDM spreading |
| STBC in formal 2 | Applied before CDM/FDM spreading |
| Detection | 1 Tap ML |

A channel model was ETU (extended typical urban) 9, and the UE speed was 3 km/h.

Figure 23:
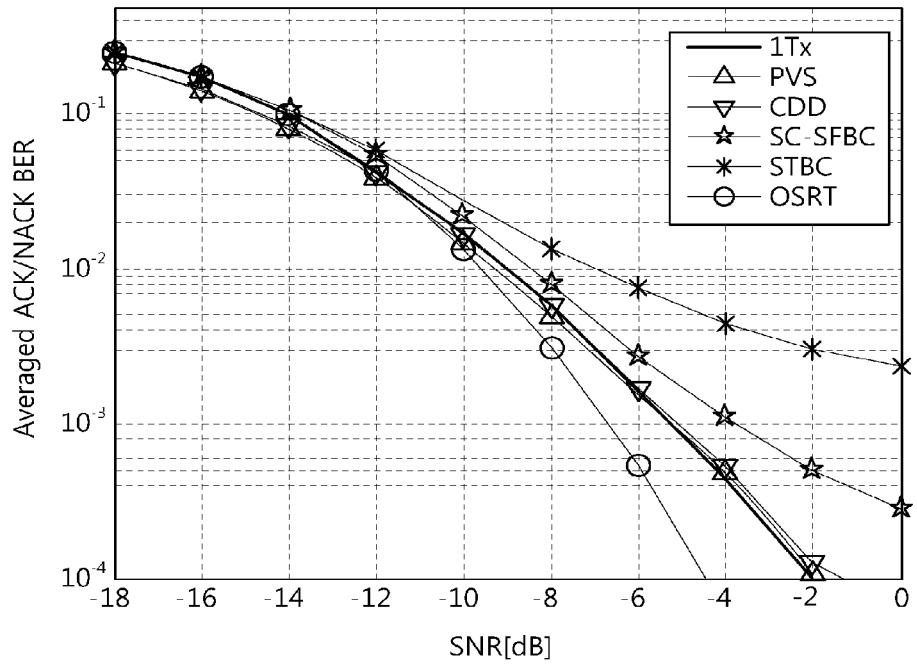
FIGS. 23 and 24 are graphs of an averaged BER of 2-bit ACK/NACK over SNR.
Figure 24:
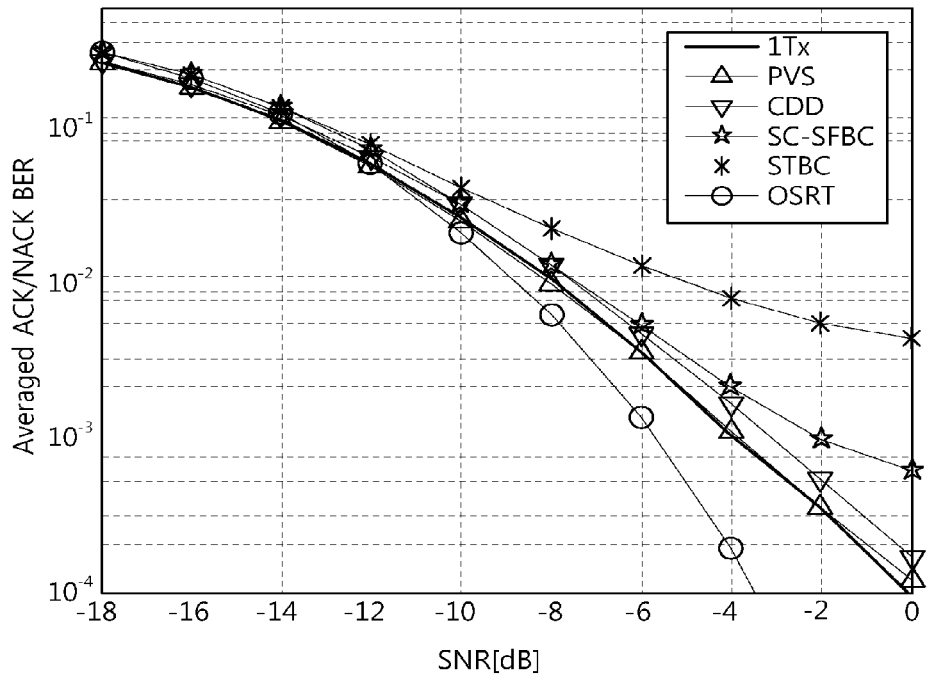

FIGS. 23 and 24 are graphs of an averaged BER of 2-bit ACK/NACK over SNR. In the graphs, the x axis is SNR, and y axis is BER. The unit of SNR is decibel (dB). All of the nine UEs in a cell transmit ACK/NACK with the same power. FIG. 23 shows the case where two transmit antennas are uncorrelated and two receive antennas are uncorrelated. FIG. 24 shows the case where two transmit antennas and two receive antennas have a high correlation, respectively.

Referring to FIGS. 23 and 24, it is noted that the OSRT exhibits the best performance and an obvious diversity gain compared with a single antenna transmission. It is also noted that the PVS or CDD shows little diversity gain, and the SC-SFBC and STBC shows a broken resource orthogonality for UE multiplexing.

Figure 25:
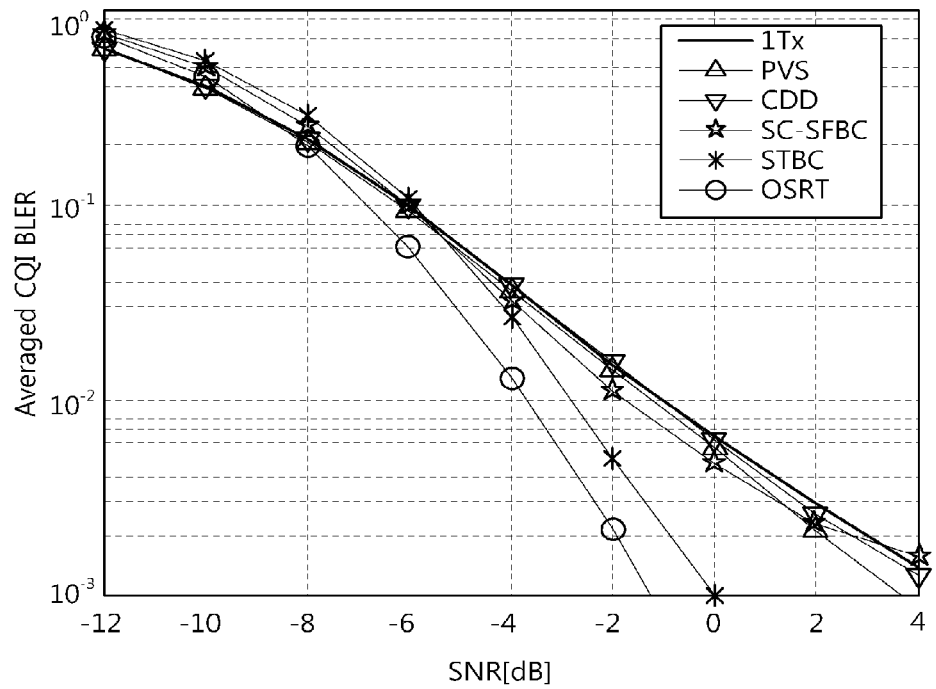
FIGS. 25 and 26 are graphs of an averaged block error rate (BLER) of CQI over SNR.
Figure 26:
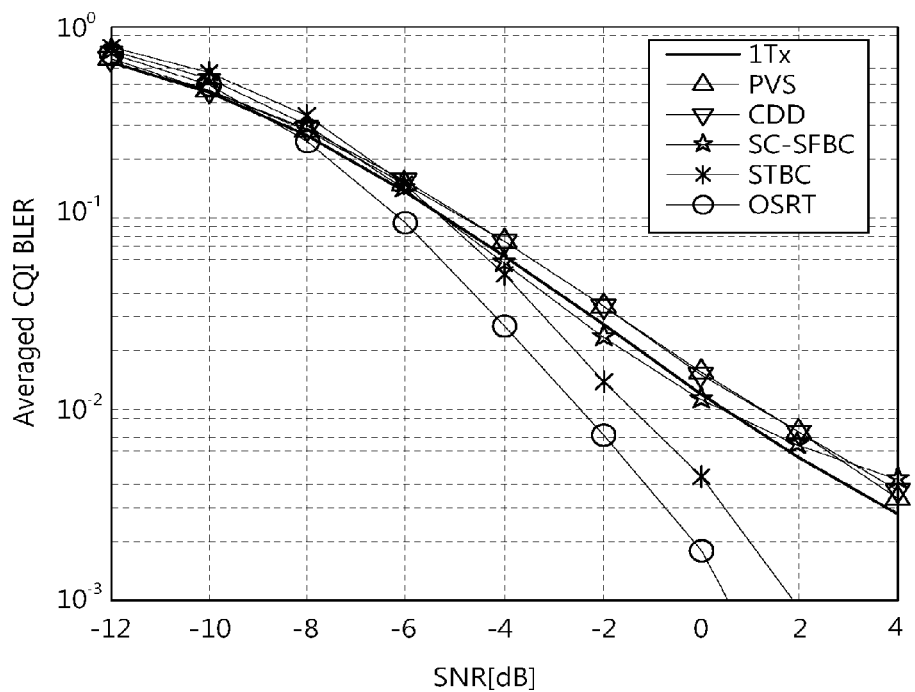

FIGS. 25 and 26 are graphs of an averaged block error rate (BLER) of CQI over SNR. Three UEs in a cell transmit a CQI with the same power. The size A of CQI information bits is 11. FIG. 25 shows the case where two transmit antennas are uncorrelated and two receive antennas are uncorrelated. FIG. 26 shows the case where two transmit antennas and two receive antennas have a high correlation, respectively.

Referring to FIGS. 25 and 26, it is noted that the OSRT exhibits the best performance and an obvious diversity gain compared with a single antenna transmission. It is also noted that the STBC can also obtains a diversity gain but smaller than that of the OSRT. The degradation of the performance of the STBC compared with the OSRT results from the transmission of simple repetition of symbols without pairing symbols. The SC-SFBC has little diversity gain. The reason is because a resource orthogonality is broken in the SC-SFBC. The PVS or CCD has little diversity gain. Also, compared with the single antenna transmission, the performance of the PVS or CDD is not substantially improved.

In this manner, the UE can effectively transmit information by using the OSRT among the transmission diversity schemes. Orthogonality can be maintained between transmit antennas. In addition, orthogonality can be maintained between UEs in a cell. Accordingly, interference of one UE on other UEs or other cell can be reduced. Because the same information is repeatedly transmitted through the plurality of transmit antennas, a diversity gain can be obtained. The UE can save transmission power. In addition, the backward compatibility with the 3GPP LTE can be satisfied. Thus, the reliability of radio communication can be enhanced, and the overall system performance can be improved.

Description so far has been mainly focused on the transmission of UL information, but the above-described content can be also applicable as it is to transmission of DL information. Also, the above-described content can be also applicable to transmission of general information such as transmission of data information as well as transmission of control information.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting information in a wireless communication system, carried in a transmitter, the method comprising:
   obtaining a first physical uplink control channel (PUCCH) resource for a first antenna port and a second PUCCH resource for a second antenna port, wherein the first antenna port and the second antenna port are different from each other;
   transmitting information, via a PUCCH, through the first antenna port using the first PUCCH resource, which includes a first cyclic shift (CS), a first orthogonal sequence (OS) and a first resource block (RB), in a single carrier frequency division multiple access (SC-FDMA) symbol in the time domain;
   transmitting the information, via the PUCCH, through the second antenna port using the second PUCCH resource, which includes a second CS, a second OS and a second RB, in the SC-FDMA symbol in the time domain,
   wherein the first PUCCH resource and the second PUCCH resource are different from each other, and
   wherein the transmission through the first antenna port using the first PUCCH resource overlaps in time with the transmission through the second antenna port using the second PUCCH resource.

2. The method of claim 1, wherein at least one of the first CS, the first OS or the first RB included in the first PUCCH resource is different from at least one of the second CS, the second CS or the second RB included in the second PUCCH resource, respectively.

3. The method of claim 1, wherein a format of the first PUCCH resource and the second PUCCH resource is PUCCH format 1/1a/1b.

4. The method of claim 1, wherein the first PUCCH resource and the second PUCCH resource are obtained from a base station (BS).

5. The method of claim 4, wherein the first PUCCH resource and the second PUCCH resource are configured by radio resource control (RRC) signaling.

6. The method of claim 1, wherein transmitting the information through the first antenna port comprises:
generating a first modulated sequence by multiplying a first cyclically shifted sequence, which is shifted based on the first CS, and the control information;
generating a first spread sequence by multiplying the first modulated sequence and the first OS; and
transmitting the first spread sequence, which is mapped to the first RB, through the first antenna port, and
wherein transmitting the information through the second antenna port comprises:
generating a second modulated sequence by multiplying a second cyclically shifted sequence, which is shifted based on the second CS, and the control information;
generating a second spread sequence by multiplying the second modulated sequence and the second OS; and
transmitting the second spread sequence which is mapped to the second RB through the second antenna port.

7. The method of claim 1, wherein the information includes control information, and
wherein the control information includes an acknowledgement/non-acknowledgement (ACK/NACK) signal.

8. A user equipment (UE) in a wireless communication system, the UE comprising:
a radio frequency (RF) unit that transmits and receives radio signal signals; and
a processor, coupled to the RF unit, that:
obtains a first physical uplink control channel (PUCCH) resource for a first antenna port and a second PUCCH resource for a second antenna port, wherein the first antenna port and the second antenna port are different from each other;
controls the RF unit to transmit information, via a PUCCH, through the first antenna port using the first PUCCH resource, which includes a first cyclic shift (CS), a first orthogonal sequence (OS) and a first resource block (RB), in a single carrier frequency division multiple access (SC-FDMA) symbol in the time domain;
controls the RF unit to transmit the information, via the PUCCH, through the second antenna port using the second PUCCH resource, which includes a second CS, a second OS and a second RB, in the SC-FDMA symbol in the time domain,
wherein the first PUCCH resource and the second PUCCH resource are different from each other, and
wherein the transmission through the first antenna port using the first PUCCH resource overlaps in time with the transmission through the second antenna port using the second PUCCH resource.

9. The UE of claim 8, wherein at least one of the first CS, the first OS or the first RB included in the first PUCCH resource is different from at least one of the second CS, the second CS or the second RB included in the second PUCCH resource, respectively.

10. The UE of claim 8, wherein a format of the first PUCCH resource and the second PUCCH resource is PUCCH format 1/1a/1b.

11. The UE of claim 8, wherein the first PUCCH resource and the second PUCCH resource are obtained from a base station (BS).

12. The UE of claim 11, wherein the first PUCCH resource and the second PUCCH resource are configured by radio resource control (RRC) signaling.

13. The UE of claim 8, wherein transmitting the information through the first antenna port comprises:
generating a first modulated sequence by multiplying a first cyclically shifted sequence, which is shifted based on the first CS, and the control information;
generating a first spread sequence by multiplying the first modulated sequence and the first OS; and
transmitting the first spread sequence which is mapped to the first RB through the first antenna port, and
wherein the transmitting the information through the second antenna port comprises:
generating a second spread sequence by multiplying the second modulated sequence and the second OS; and
transmitting the second spread sequence which is mapped to the second RB through the second antenna port.

14. The UE of claim 8, wherein the information includes control information, and
wherein the control information includes an acknowledgement/non-acknowledgement (ACK/NACK) signal.

* * * * *